US010158912B2

(12) United States Patent
Friedrich et al.

(10) Patent No.: US 10,158,912 B2
(45) Date of Patent: Dec. 18, 2018

(54) EVENT-BASED MEDIA PLAYBACK

(71) Applicant: DISH Technologies L.L.C., Englewood, CO (US)

(72) Inventors: Alisson Friedrich, Marietta, GA (US); Kevin Swain, Mableton, GA (US)

(*) Notice: Subject to any disclaimer, the term of this patent is extended or adjusted under 35 U.S.C. 154(b) by 0 days.

(21) Appl. No.: 15/806,918

(22) Filed: Nov. 8, 2017

(65) Prior Publication Data

US 2018/0070132 A1    Mar. 8, 2018

Related U.S. Application Data

(63) Continuation of application No. 13/919,402, filed on Jun. 17, 2013, now Pat. No. 9,930,404.

(51) Int. Cl.
H04N 21/44 (2011.01)
H04N 21/4728 (2011.01)
H04N 21/472 (2011.01)

(52) U.S. Cl.
CPC ... H04N 21/44008 (2013.01); H04N 21/4728 (2013.01); H04N 21/47217 (2013.01)

(58) Field of Classification Search
CPC combination set(s) only.
See application file for complete search history.

(56) References Cited

U.S. PATENT DOCUMENTS

| | | | |
|---|---|---|---|
| 6,005,562 A | 12/1999 | Shiga et al. | |
| 6,177,931 B1 | 1/2001 | Alexander et al. | |
| 6,681,396 B1 | 1/2004 | Bates et al. | |
| 6,774,924 B2 | 8/2004 | Kato et al. | |
| 7,174,512 B2 | 2/2007 | Martin et al. | |
| 7,197,715 B1 | 3/2007 | Valeria | |
| 7,633,887 B2 | 12/2009 | Panwar et al. | |
| 7,680,894 B2 | 3/2010 | Diot et al. | |
| 7,774,811 B2 | 8/2010 | Poslinski et al. | |
| 7,818,368 B2 | 10/2010 | Yang et al. | |
| 7,825,989 B1 | 11/2010 | Greenberg | |
| 7,849,487 B1 * | 12/2010 | Vosseller | G11B 15/026 725/102 |
| 8,024,753 B1 | 9/2011 | Kummer et al. | |

(Continued)

FOREIGN PATENT DOCUMENTS

EP    1 865 716 A2    12/2007
EP    2 309 733 B1    4/2011

(Continued)

OTHER PUBLICATIONS

Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.

(Continued)

*Primary Examiner* — Alexander Gee
(74) *Attorney, Agent, or Firm* — Kilpatrick Townsend & Stockton LLP

(57) ABSTRACT

Particular portions or events of recorded television programming identified as having especially significant or interesting detail may be played-back at normal speed without user input; whereas other portions or events of the recorded television programming may be played-back at greater than normal speed.

20 Claims, 9 Drawing Sheets

(56) References Cited

U.S. PATENT DOCUMENTS

| | | |
|---|---|---|
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,667,527 B2 | 3/2014 | Yan et al. |
| 8,689,258 B2 | 4/2014 | Kemp |
| 8,752,084 B1 | 6/2014 | Lai et al. |
| 8,855,681 B1 | 10/2014 | George et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1* | 2/2016 | Morgan ............ H04N 21/44008 |
| 9,288,551 B2 | 3/2016 | Kummer |
| 9,420,333 B2 | 8/2016 | Martch et al. |
| 9,426,516 B2 | 8/2016 | Kemp |
| 9,565,474 B2 | 2/2017 | Petruzzelli et al. |
| 9,602,875 B2 | 3/2017 | Hussain |
| 9,609,379 B2 | 3/2017 | Martch et al. |
| 9,621,960 B2 | 4/2017 | Hardy et al. |
| 9,681,176 B2 | 6/2017 | Mountain |
| 9,681,196 B2 | 6/2017 | Mountain |
| 9,769,540 B2 | 9/2017 | Kummer |
| 9,800,938 B2 | 10/2017 | Keipert |
| 9,848,249 B2 | 12/2017 | Freed et al. |
| 9,930,404 B2 | 3/2018 | Friedrich et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0090198 A1 | 7/2002 | Rosenberg et al. |
| 2002/0164155 A1 | 11/2002 | Mate |
| 2002/0166122 A1 | 11/2002 | Kikinis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066076 A1 | 4/2003 | Minahan |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0154485 A1 | 8/2003 | Johnson et al. |
| 2003/0172376 A1 | 9/2003 | Coffin, III |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0091690 A1 | 4/2005 | Delpuch et al. |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0191041 A1 | 9/2005 | Braun et al. |
| 2005/0240961 A1 | 10/2005 | Jerding et al. |
| 2005/0264705 A1 | 12/2005 | Kitamura |
| 2005/0275758 A1 | 12/2005 | McEvilly et al. |
| 2006/0089870 A1 | 4/2006 | Myhr |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0061830 A1 | 3/2007 | Chang |
| 2007/0074256 A1 | 3/2007 | Jung et al. |
| 2007/0079342 A1 | 4/2007 | Ellis et al. |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157281 A1 | 7/2007 | Ellis et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0244678 A1 | 10/2008 | Kim et al. |
| 2008/0270038 A1 | 10/2008 | Partovi et al. |
| 2008/0282312 A1 | 11/2008 | Blinnikka |
| 2008/0300982 A1 | 12/2008 | Larson et al. |
| 2008/0305832 A1 | 12/2008 | Greenberg |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0150941 A1 | 6/2009 | Riedl et al. |
| 2009/0178071 A1 | 7/2009 | Whitehead |
| 2009/0210898 A1 | 8/2009 | Childress et al. |
| 2009/0217332 A1 | 8/2009 | Hindle et al. |
| 2009/0228911 A1 | 9/2009 | Vrijsen |
| 2009/0234828 A1 | 9/2009 | Tu |
| 2009/0249412 A1 | 10/2009 | Bhogal et al. |
| 2009/0276803 A1 | 11/2009 | Weaver |
| 2009/0282445 A1 | 11/2009 | Yang et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0031306 A1 | 2/2010 | Pandey et al. |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0083327 A1 | 4/2010 | Toba et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0125864 A1 | 5/2010 | Dwyer et al. |
| 2010/0146560 A1 | 6/2010 | Bonfrer |
| 2010/0153983 A1 | 6/2010 | Phillmon et al. |
| 2010/0153999 A1 | 6/2010 | Yates |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0268779 A1 | 10/2010 | Rao |
| 2010/0269144 A1 | 10/2010 | Forsman et al. |
| 2010/0272257 A1 | 10/2010 | Beals |
| 2010/0305729 A1 | 12/2010 | Glitsch et al. |
| 2010/0319019 A1 | 12/2010 | Zazza |
| 2010/0322592 A1* | 12/2010 | Casagrande ............ H04N 5/147 |
| | | 386/241 |
| 2010/0333131 A1 | 12/2010 | Parker et al. |

(56) References Cited

U.S. PATENT DOCUMENTS

| | | |
|---|---|---|
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0173337 A1 | 7/2011 | Walsh et al. |
| 2011/0191417 A1 | 8/2011 | Rathod |
| 2011/0202956 A1 | 8/2011 | Connelly et al. |
| 2011/0206342 A1 | 8/2011 | Thompson et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2011/0295667 A1 | 12/2011 | Butler |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0066722 A1 | 3/2012 | Cheung et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0129479 A1 | 5/2012 | Kanojia et al. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0260295 A1 | 10/2012 | Rondeau |
| 2012/0278834 A1 | 11/2012 | Richardson |
| 2012/0278837 A1 | 11/2012 | Curtis et al. |
| 2012/0284745 A1 | 11/2012 | Strong |
| 2012/0295560 A1 | 11/2012 | Mufti |
| 2012/0311633 A1 | 12/2012 | Mandrekar et al. |
| 2013/0031216 A1 | 1/2013 | Willis et al. |
| 2013/0042280 A1 | 2/2013 | Chen |
| 2013/0055304 A1 | 2/2013 | Kirby et al. |
| 2013/0061313 A1 | 3/2013 | Cullimore et al. |
| 2013/0071090 A1 | 3/2013 | Berkowitz et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0232148 A1* | 9/2013 | MacDonald ...... G06F 17/30873 707/740 |
| 2013/0243398 A1 | 9/2013 | Templeman et al. |
| 2013/0263189 A1 | 10/2013 | Garner |
| 2013/0268951 A1 | 10/2013 | Wyatt et al. |
| 2013/0283162 A1 | 10/2013 | Aronsson et al. |
| 2013/0291037 A1 | 10/2013 | Im et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0067998 A1* | 3/2014 | Garcia ................ H04L 65/4084 709/217 |
| 2014/0068675 A1 | 3/2014 | Mountain |
| 2014/0068692 A1 | 3/2014 | Archibong et al. |
| 2014/0114966 A1 | 4/2014 | Bilinski et al. |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0157339 A1 | 6/2014 | Zhang et al. |
| 2014/0215539 A1 | 7/2014 | Chen et al. |
| 2014/0247931 A1 | 9/2014 | Swamy et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0150052 A1 | 5/2015 | Errico et al. |
| 2015/0181132 A1 | 6/2015 | Kummer et al. |
| 2015/0181279 A1 | 6/2015 | Martch et al. |
| 2015/0229981 A1 | 8/2015 | Williams et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |
| 2017/0111696 A1 | 4/2017 | Petruzzelli et al. |
| 2017/0213243 A1* | 7/2017 | Dollard ............. G06Q 30/0249 |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 4/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 7/2007 |
| WO | 2007/098067 A1 | 8/2007 |
| WO | 2009/073925 A1 | 6/2009 |
| WO | 2011/040999 A1 | 4/2011 |
| WO | 2013/016626 A1 | 1/2013 |
| WO | 2014/072742 A1 | 5/2014 |
| WO | 2014/164782 A1 | 10/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
Extended European Search Report for EP 14160140.1, 7 pages.
Office Action for EP 14160140.1 dated Jan. 19, 2016, 5 pages.
European Search Report for EP 14197940.1 dated Apr. 28, 2015, 13 pages.
International Search Report and Written Opinion for PCT/US2014/023466 dated Jul. 10, 2014, 15 pages.
International Preliminary Report on Patentability for PCT/US2014/023466 dated Sep. 15, 2015, 8 pages.
International Search Report and Written Opinion for PCT/EP2015/069461 dated Oct. 1, 2015, 13 pages.

(56) References Cited

OTHER PUBLICATIONS

International Search Report and Written Opinion for PCT/EP2015/069456 dated Oct. 5, 2015, all pages.
International Search Report and Written Opinion of PCT/US2014/033796 dated Sep. 5, 2014, 12 pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
International Search Report and Written Opinion for PCT/GB2015/052570 dated Dec. 11, 2015, 13 pages.
International Preliminary Report on Patentability for PCT/GB2015/052570 dated Mar. 7, 2017, all pages.
International Search Report and Written Opinion for PCT/GB2015/052456 dated Jun. 13, 2016, all pages.
International Preliminary Report on Patentability for PCT/GB2015/052456 dated Feb. 28, 2017, all pages.
U.S. Appl. No. 13/801,932, filed Mar. 13, 2013 Non Final Office Action dated Jun. 24, 2015, 21 pages.
U.S. Appl. No. 13/801,932, filed Mar. 13, 2013 Final Office Action dated Dec. 17, 2015, 23 pages.
U.S. Appl. No. 13/801,932, filed Mar. 13, 2013 Non-Final Rejection dated May 20, 2016, 28 pages.
U.S. Appl. No. 13/801,932, filed Mar. 13, 2013 Notice of Allowance dated Nov. 25, 2016, all pages.
U.S. Appl. No. 13/834,916, filed Mar. 15, 2013 Non Final Office Action dated Aug. 8, 2014, 19 pages.
U.S. Appl. No. 13/834,916, filed Mar. 15, 2013 Final Office Action dated Jan. 12, 2015, 22 pages.
U.S. Appl. No. 13/834,916, filed Mar. 15, 2013 Non Final Office Action dated Apr. 27, 2015, 22 pages.
U.S. Appl. No. 13/834,916, filed Mar. 15, 2013 Final Office Action dated Dec. 14, 2015, 31 pages.
U.S. Appl. No. 13/834,916, filed Mar. 15, 2013 Non-Final Rejection dated Aug. 18, 2016, all pages.
U.S. Appl. No. 13/834,916, filed Mar. 15, 2013 Final Office Action dated Mar. 13, 2017, all pages.
U.S. Appl. No. 13/834,916, filed Mar. 15, 2013 Non-Final Rejection dated Jun. 29, 2017, all pages.
U.S. Appl. No. 13/834,916, filed Mar. 15, 2013 Final Rejection dated Dec. 29, 2017, all pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
U.S. Appl. No. 14/297,279, filed Jun. 5, 2014 Final Rejection dated Apr. 22, 2016, 33 pages.
U.S. Appl. No. 14/297,279, filed Jun. 5, 2014 Non-Final Office Action dated Feb. 9, 2017, all pages.
U.S. Appl. No. 14/297,279, filed Jun. 5, 2014 Notice of Allowance dated May 19, 2017, all pages.
U.S. Appl. No. 15/182,404, filed Jun. 14, 2016, Non-Final Rejection dated Jul. 20, 2017, all pages.
U.S. Appl. No. 15/182,404, filed Jun. 14, 2016, Final Rejection dated Jan. 9, 2018, all pages.
U.S. Appl. No. 14/981,509, filed Dec. 28, 2015, Preinterview first office action dated May 8, 2017, all pages.
U.S. Appl. No. 14/981,509, filed Dec. 28, 2015, Final Rejection dated Oct. 19, 2017, all pages.
U.S. Appl. No. 14/200,864, filed Mar. 7, 2014, Non-Final Office Action dated Dec. 5, 2014, 35 pages.
U.S. Appl. No. 14/200,864, filed Mar. 7, 2014 Final Office Action dated Jun. 18, 2015, 36 pages.
U.S. Appl. No. 14/200,864, filed Mar. 7, 2014 Non-Final Office Action dated Feb. 18, 2016, 61 pages.
U.S. Appl. No. 14/200,864, filed Mar. 7, 2014 Notice of Allowance dated Sep. 15, 2016, all pages.
U.S. Appl. No. 13/886,873, filed May 3, 2013, Notice of Allowance dated Oct. 24, 2014, 40 pages.
U.S. Appl. No. 14/470,248, filed Aug. 27, 2014, Preinterview first office action dated Sep. 4, 2015, 22 pages.
U.S. Appl. No. 14/470,248, filed Aug. 27, 2014, Final Office Action dated Feb. 16, 2016, 26 pages.
U.S. Appl. No. 14/470,248, filed Aug. 27, 2014, Non Final Office Action dated Jul. 25, 2016, all pages.
U.S. Appl. No. 14/470,248, filed Aug. 27, 2014, Final Office Action dated Dec. 9, 2016, all pages.
U.S. Appl. No. 14/470,248, filed Aug. 27, 2014, Non-Final Office Action dated Apr. 20, 2017, all pages.
U.S. Appl. No. 14/470,248, filed Aug. 27, 2014, Notice of Allowance dated Aug. 8, 2017, all pages.
U.S. Appl. No. 14/470,279, filed Aug. 27, 2014, Preinterview first office action dated Aug. 26, 2015, 23 pages.
U.S. Appl. No. 14/470,279, filed Aug. 27, 2014, Final Office Action dated Jan. 22, 2016, 25 pages.
U.S. Appl. No. 14/470,279, filed Aug. 27, 2014, Non Final Office Action dated Jul. 19, 2016, all pages.
U.S. Appl. No. 14/470,279, filed Aug. 27, 2014, Final Office Action dated Dec. 9, 2016, all pages.
U.S. Appl. No. 14/470,279, filed Aug. 27, 2014, Notice of Allowance dated Mar. 16, 2017, all pages.
U.S. Appl. No. 14/479,007, filed Sep. 5, 2014, Final Office Action dated Jan. 23, 2017, all pages.
U.S. Appl. No. 14/479,007, filed Sep. 5, 2014, Non-Final Office Action dated Sep. 1, 2015, 44 pages.
U.S. Appl. No. 14/479,007, filed Sep. 5, 2014, Final Office Action dated Feb. 22, 2016, 37 pages.
U.S. Appl. No. 14/479,007, filed Sep. 5, 2014, Non-Final Office Action dated Jul. 27, 2016, 37 pages.
U.S. Appl. No. 14/479,007, filed Sep. 5, 2014, Non-Final Office Action dated Jun. 1, 2017, all pages.
U.S. Appl. No. 14/591,474, filed Jan. 7, 2015, Non-Final Office Action dated Feb. 12, 2016, 32 pages.
U.S. Appl. No. 14/591,474, filed Jan. 7, 2015, Non-Final Office Action dated Dec. 16, 2016, 32 pages.
U.S. Appl. No. 14/494,079, filed Sep. 23, 2014, Preinterview first office action dated Feb. 10, 2016, 6 pages.
U.S. Appl. No. 15/195,527, filed Jun. 28, 2016, Non-Final Rejection dated Sep. 30, 2016, all pages.
U.S. Appl. No. 15/195,527, filed Jun. 28, 2016, Notice of Allowance dated Feb. 3, 2017, all pages.
Extended European Search Report for EP 11166892.7 dated Oct. 6, 2011, 7 pages.
U.S. Appl. No. 13/942,451, filed Jul. 15, 2013 Final Office Action dated Apr. 30, 2015, 33 pages.
U.S. Appl. No. 13/942,451, filed Jul. 15, 2013 Non Final Office Action dated Jul. 28, 2014, 27 pages.
U.S. Appl. No. 13/942,451, filed Jul. 15, 2013 Non Final Office Action dated Jan. 8, 2016, 41 pages.
U.S. Appl. No. 13/942,451, filed Jul. 15, 2013 Final Office Action dated Jun. 22, 2016, all pages.
U.S. Appl. No. 13/942,451, filed Jul. 15, 2013 Non Final Office Action dated Oct. 25, 2016, all pages.
U.S. Appl. No. 13/942,451, filed Jul. 15, 2013 Final Rejection dated Apr. 19, 2017, all pages.
U.S. Appl. No. 13/942,451, filed Jul. 15, 2013 Notice of Allowance dated Aug. 7, 2017, all pages.
U.S. Appl. No. 13/919,702, filed Jun. 17, 2013 Notice of Allowance dated Aug. 10, 2017, all pages.
U.S. Appl. No. 13/919,702, filed Jun. 17, 2013 Non Final Office Action dated Jun. 11, 2014, 25 pages.
U.S. Appl. No. 13/919,702, filed Jun. 17, 2013 Final Office Action dated Nov. 18, 2014, 24 pages.
U.S. Appl. No. 13/919,702, filed Jun. 17, 2013 Non-Final Office Action dated Apr. 30, 2015, 26 pages.
U.S. Appl. No. 13/919,702, filed Jun. 17, 2013 Final Office Action dated Dec. 31, 2015, 30 pages.
U.S. Appl. No. 13/919,702, filed Jun. 17, 2013 Non Final Office Action dated Jun. 30, 2016, all pages.
U.S. Appl. No. 13/919,702, filed Jun. 17, 2013 Final Office Action dated Oct. 28, 2016, all pages.

(56) References Cited

OTHER PUBLICATIONS

U.S. Appl. No. 13/919,702, filed Jun. 17, 2013 Non Final Office Action dated Apr. 28, 2017, all pages.
U.S. Appl. No. 13/971,579, filed Aug. 20, 2013 Non Final Office Action dated Oct. 28, 2014, 35 pages.
U.S. Appl. No. 13/971,579, filed Aug. 20, 2013 Notice of Allowance dated Feb. 27, 2015, 28 pages.
U.S. Appl. No. 14/071,613, filed Nov. 4, 2013 Non-Final Office Action dated May 18, 2015, 20 pages.
U.S. Appl. No. 14/071,613, filed Nov. 4, 2013 Final Office Action dated Oct. 8, 2015, 11 pages.
U.S. Appl. No. 14/139,299, filed Dec. 23, 2013, Non Final Office Action dated Aug. 14, 2015, 39 pages.
U.S. Appl. No. 14/139,299, filed Dec. 23, 2013, Final Office Action dated Feb. 25, 2016, all pages.
U.S. Appl. No. 14/139,299, filed Dec. 23, 2013, Non Final Office Action dated Jun. 20, 2016, all pages.
U.S. Appl. No. 14/139,299, filed Dec. 23, 2013, Final Office Action dated Feb. 30, 2017, all pages.
U.S. Appl. No. 14/139,299, filed Dec. 23, 2013, Notice of Allowance dated Aug. 16, 2017, all pages.
U.S. Appl. No. 14/139,420, filed Dec. 23, 2013 Non-Final Office Action dated Apr. 30, 2015, 27 pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Non Final Office Action dated Nov. 5, 2015, 31 pages.
U.S. Appl. No. 14/470,392, filed Aug. 27, 2014 Final Office Action dated Mar. 4, 2016, all pages.
U.S. Appl. No. 14/470,392, filed Aug. 27, 2014 Non-Final Office Action dated Aug. 5, 2016, all pages.
U.S. Appl. No. 14/470,392, filed Aug. 27, 2014, Notice of Allowance dated Feb. 13, 2017, all pages.
U.S. Appl. No. 14/470,415, filed Aug. 27, 2014 Non Final Office Action dated Nov. 18, 2015, 28 pages.
U.S. Appl. No. 14/470,415, filed Aug. 27, 2014 Final Office Action dated Mar. 3, 2016, all pages.
U.S. Appl. No. 14/470,415, filed Aug. 27, 2014 Non Final Office Action dated Jul. 29, 2016, all pages.
U.S. Appl. No. 15/389,859, filed Dec. 23, 2016 Final Rejection dated Sep. 22, 2017, all pages.
U.S. Appl. No. 15/389,859, filed Dec. 23, 2016 Non Final Office Action dated May 25, 2017, all pages.
U.S. Appl. No. 14/981,509, filed Dec. 28, 2015, Non-Final Rejection dated Apr. 6, 2018, all pages.

* cited by examiner

EVENT-BASED MEDIA PLAYBACK

CROSS-REFERENCE TO RELATED APPLICATIONS

The present application is a continuation of U.S. patent application Ser. No. 13/919,702, filed Jun. 17, 2013, entitled "EVENT-BASED MEDIA PLAYBACK", the contents of which are incorporated herein by reference, in their entirety.

BACKGROUND

The advent of the DVR (Digital Video Recorder) and the availability of high-capacity and affordable computer-readable storage devices have made available many possibilities to television programming service providers and viewers alike. Recently, television viewers have come to expect the ability to customize and manage the recording and playback of television programming

SUMMARY

This Summary does not in any way limit the scope of the claimed subject matter.

In an aspect, a computer-implemented method is disclosed. The method may include receiving a command to playback stored media content at a particular rate. The method may include identifying, at a particular time during playback of the media content at the particular rate, a portion of the media content occurring at a time subsequent the particular time that is tagged as distinguished from other portions of the media content. The method may include outputting, for presentation by a device in response to the identifying, the media content at a rate less than the particular rate, and at a time prior to a time associated with the portion of the media content.

In an aspect, a computing system is disclosed that may include one or more processors and a memory communicatively coupled with and readable by the one or more processors. The memory may have stored therein processor-readable instructions that, when executed by the one or more processors, cause the one or more processors to detect receipt of a command to playback stored media content at a particular rate. The memory may have stored therein processor-readable instructions that, when executed by the one or more processors, cause the one or more processors to identify, at a particular time during playback of the media content at the particular rate, a portion of the media content occurring at a time subsequent the particular time that is tagged as distinguished from other portions of the media content. The memory may have stored therein processor-readable instructions that, when executed by the one or more processors, cause the one or more processors to output, for presentation by a device in response to the identifying, the media content at a rate less than the particular rate, and at a time prior to a time associated with the portion of the media content.

In an aspect, a non-transitory processor-readable medium comprising processor-readable instructions is disclosed. The processor-readable instructions may be defined or configured to cause one or more processors to detect receipt of a command to playback stored media content at a particular rate. The processor-readable instructions may be defined or configured to cause one or more processors to identify, at a particular time during playback of the media content at the particular rate, a portion of the media content occurring at a time subsequent the particular time that is tagged as distinguished from other portions of the media content. The processor-readable instructions may be defined or configured to cause one or more processors to output, for presentation by a device in response to the identifying, the media content at a rate less than the particular.

DETAILED DESCRIPTION

The present disclosure is directed to or towards providing a mechanism for an individual to more quickly consume recorded media content. For example, particular portions or events of recorded television programming identified as having especially significant or interesting detail may be played-back at "normal" speed without user input; whereas other portions or events of the recorded television programming may be played-back at greater than normal speed. Although not so limited, an appreciation of the various aspects of the present disclosure may be gained from the following discussion in connection with the drawings.

Figure 1:
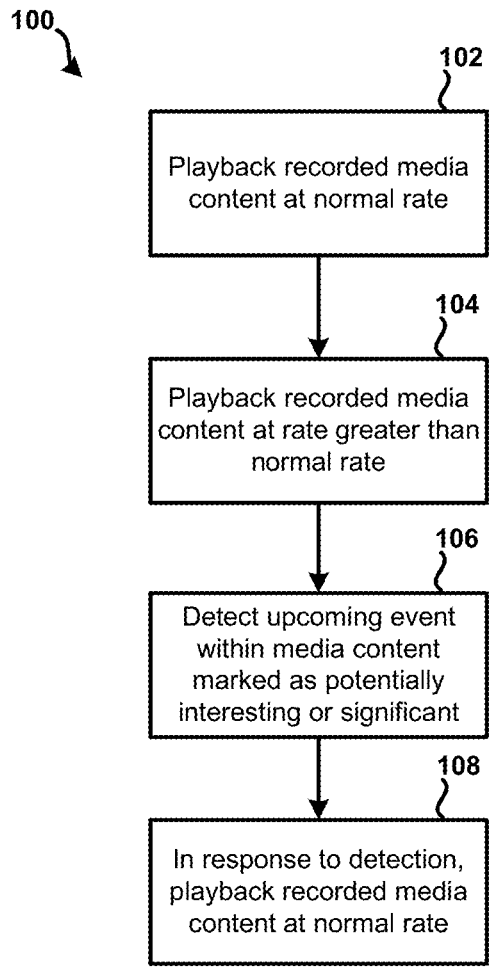
FIG. 1 shows a first example method in accordance with the present disclosure.

For instance, referring now to FIG. 1, a first example method 100 is shown in accordance with the present disclosure. In general, the example method 100 as described may be performed on or by at least one computing system or device in a networked computing environment. An example of such a computing system or device may include a television receiver, and an example of such a networked computing environment may include a content distribution system incorporating various aspects of a satellite-based content distribution network, such as discussed in connection with at least FIG. 2. Other embodiments are possible.

At step 102, a computing system may playback particular recorded media content at a normal rate. For example, a television viewer may push "play" using a remote control to access a recorded sporting event for viewing on a television, such as a particular soccer match for instance. In response, a television receiver may playback the recorded sporting event content to the television at a typical or normal frame rate, such as about 30 FPS (Frames Per Second) for instance. Other embodiments are possible. For example, the particular recorded media content could in practice be any type of audio and/or video that is played-back for a user to experience at a speed or rate at which it would be usually or normally played.

At step 104, the computing system may playback the particular recorded media content at a rate greater than the normal rate. For instance, the television viewer may push a dedicated button using the remote control to accelerate playback of the recorded sporting event. In response, the television receiver may playback the recorded sporting event to the television at a frame rate that may be likened to a fast-forward operation, such as about 60 FPS for example. Other embodiments are possible. For instance, the computing system or device may be configured so as to reproduce video of the recorded sporting event at any frame rate as desired, such as 100 FPS for example.

The accelerated playback of the present disclosure is different than a conventional fast-forward operation and/or trick mode. In particular, a conventional fast-forward operation may only present for viewing a certain number of frames selected from a particular sequence of frames. For example, in an MPEG (Moving Picture Experts Group) video compression implementation, only the I-frames in a particular sequences of I-frames, P-frames, and B-frames, may be selected during reproduction of video during conventional fast-forward. Such an implementation may produce a "choppy" reproduction of video, however, where although frames would be presented for viewing at a particular frame rate (e.g., 60 FPS), those frames might be separated from each other substantially in time. For example, a first I-frame of a particular sequence may be presented for viewing for $\frac{1}{60}^{th}$ of a second, and then a second I-frame may presented for viewing for a next $\frac{1}{60}^{th}$ of a second. However, those two I-frames might be separated in time by one or two full seconds for example. In this example, and continuing with the soccer match scenario mentioned above, a viewer might "see" a player have possession of a soccer ball at the first I-frame, and then see the soccer ball in the air at the second I-frame. The viewer though might not see the player kick the soccer ball so that the soccer ball is airborne. In this manner, a conventional fast-forward operation may produce a choppy reproduction of video.

In contrast, the accelerated playback of the present disclosure may present for viewing each and every one of a number of frames selected from a particular sequence of frames. For example, in an MPEG video compression implementation, each and every I-frame, P-frame, and B-frame in a particular sequences of I-frames, P-frames, and B-frames, may be selected during reproduction of video during accelerated playback. Such an implementation may produce a "smooth" reproduction of video, where frames would be presented to a user at a particular frame rate (e.g., 60 FPS) for viewing, and respective ones of those frames are adjacent to each other in time. For example, a first I-frame of the video may be presented for viewing for $\frac{1}{60}^{th}$ of a second, and then an immediately subsequent P-frame of the video, which follows the first I-frame in time, may be presented for viewing for a next $\frac{1}{60}^{th}$ of a second, and then an immediately subsequent B-frame of the video, which follows the P-frame in time, may presented for viewing for a next $\frac{1}{60}^{th}$ of a second, and so on until a second I-frame of the video may presented for viewing for another $\frac{1}{60}^{th}$ of a second. In this example, and continuing with the soccer match scenario mentioned above, a viewer might see a player have possession of a soccer ball at the first I-frame, and then see the player kick the soccer ball over a sequence of P-frames and/or B-frames, and then see the soccer ball in the air at the second I-frame. In this manner, the accelerated playback of the present disclosure may produce a smooth reproduction of video, in comparison to a conventional fast-forward operation.

At step 106, the computing system may detect an upcoming event within the particular recorded media content that is marked as potentially interesting or significant. For example, and continuing with the soccer match scenario mentioned above, during playback of the soccer match at the rate greater than the normal system rate (see 104), the television receiver may detect particular information embedded within data associated with the recorded soccer match, or from a separate file, or some other method, that consists of a list or listing of unique identifiers. Here, a particular one of the unique identifiers may generally mark or tag the temporal position of a particular goal within the soccer match. The unique identifier may generally mark or tag the temporal position of the goal because the unique identifier may be offset in time prior to the actual goal within the match, such as by five seconds for example. An example of such an implementation is discussed further below in connection with at least FIG. 5. Additionally, it is contemplated that there are many different methods that may be used to generate the list in accordance with this disclosure, as discussed further below in connection with at least FIG. 6.

At step 108, the computing system may playback the particular recorded media content at the normal rate. The mechanism though used to initiate playback of the particular recorded media content at the normal rate at step 108 is different than that described above at step 102. In particular, the mechanism is automated (step 108) rather than manual (step 102), because the computing system may playback the particular recorded media content at the normal rate in response to detection of the upcoming event within the media content. For example, and continuing with the soccer match scenario mentioned above, the computing system may detect a unique identifier associated with the particular goal of the soccer match (step 106), and then playback the soccer match at normal rate (step 108) about ten seconds prior to the particular goal within the soccer match, so that a television viewer may watch the goal at normal speed, along with a portion of play of the soccer match leading up to particular goal. Other embodiments are possible. For example, the computing system may be configured so as to playback the soccer match at normal rate at any time prior the particular goal or highlight as desired, such as about sixty seconds prior to the goal for example. Still other embodiments are possible.

In the example method 100 of FIG. 1, a user may more quickly consume the particular recorded media content. For example, and continuing with the soccer match scenario mentioned above, a television viewer may initially watch a soccer match at a normal playback speed. The television viewer may then watch the soccer match at an accelerated playback speed, where the accelerated playback speed is different than conventional fast-forwarding, instead providing for a smooth viewing experience. Despite the accelerated playback speed, the television viewer may watch highlights of the soccer match at a normal playback speed, without further manual input required. Other embodiments are though possible. For example, a user may be provided the ability to skip straight into a highlight without watching the soccer match in high speed, or watching only the highlights the soccer match.

Further, each and every frame of particular recorded media content may not necessarily be played back. The present disclosure is directed towards making playback smoother by using particular frames selected as desired, where selected frames may be implementation specific and/or based on technical capability. For example, in one implementation, I and P frames may be used or played back while dropping B frames. Further, while the above-description is MPEG-2 centric, different video technologies make use of different encryption schemes, and aspects of the present disclosure may be applicable in other different broader technology areas, such as technologies that leverage temporally compressed frames. In general, temporal compression is a type of compression used by some codecs that assumes frames beside each other look similar. The first frame in the series may be entirely digitized, called a key frame. In the next frame, only, the information that has changed is digitized. Because temporal compression makes one frame depend on another it makes editing temporally compressed video difficult. Such features or aspects as described in connection with FIG. 1 may be beneficial and/or advantageous in many respects, as may be understood in light of the following description in connection with FIGS. 2-9.

Figure 2:
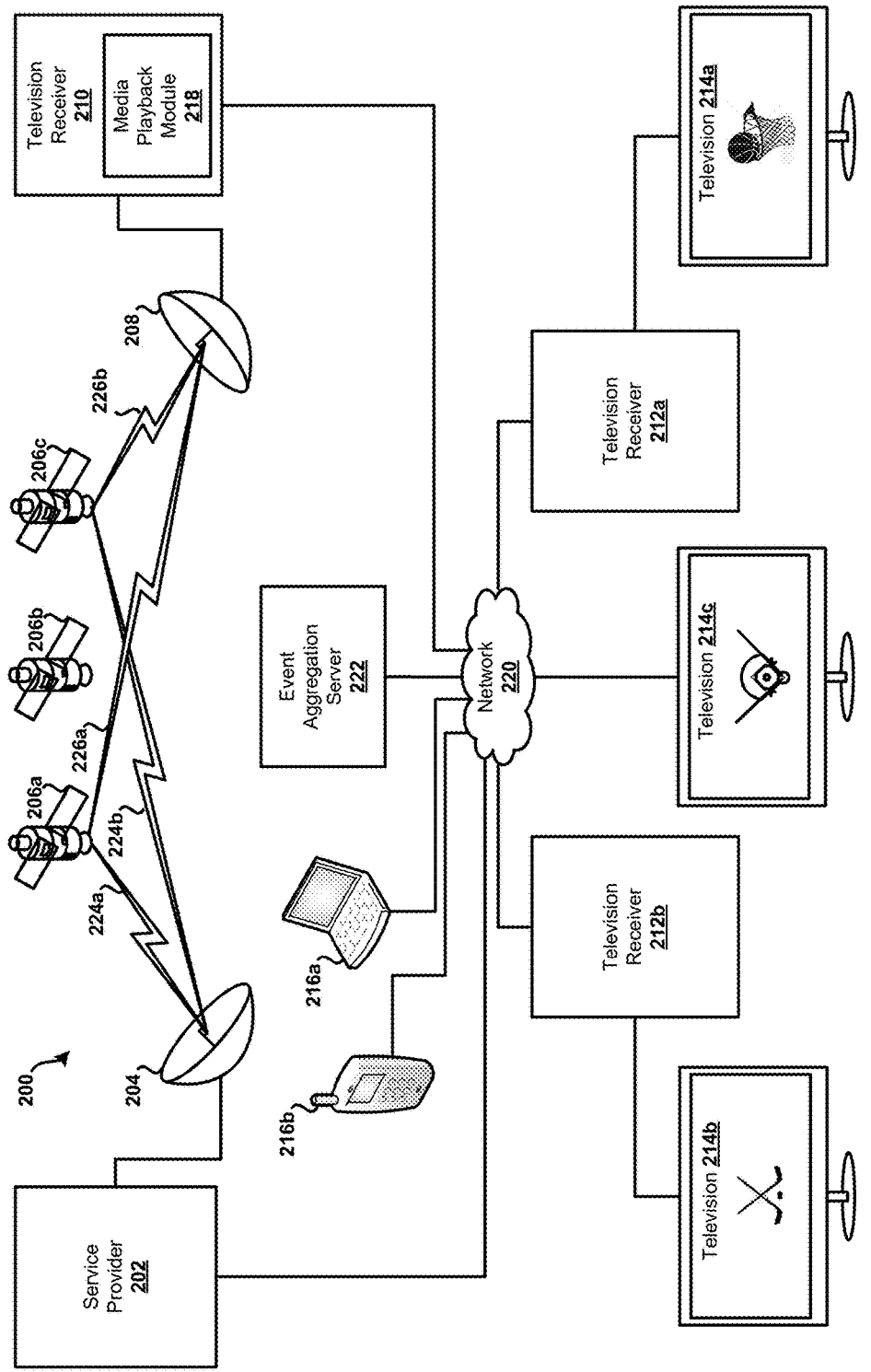
FIG. 2 shows an example media content distribution system in which aspects of the present disclosure may be implemented.

For example, referring now to FIG. 2 an example media content distribution system 200 is shown in which aspects of the present disclosure may be implemented. For brevity, the system 200 is depicted in a simplified and conceptual form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system.

The example system 200 may include a service provider 202, a satellite uplink 204, a plurality of orbiting (e.g., geosynchronous) satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one event aggregation server 222. In the present example, the PTR 210 may include a MPM (Media Playback) module 218. In general, the MPM module 218 may in one aspect be configured to implement event-based media playback in accordance with the present disclosure, as discussed in further detail below.

The system 200 may also include at least one network 220 that establishes a bi-directional communication path for data transfer between and among the PTR 210, STRs 212*a-b*, televisions 214*a-c*, computing devices 216*a-b*, and event aggregation server 222 of the example system 200. In some embodiments, the network 220 may further establish a bi-directional communication path for data transfer between the PTR 210 and the service provider 202. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the example system 200.

The PTR 210, and the STRs 212*a-b*, as described throughout may generally be any type of television receiver, such as a STB (Set-Top-Box) for example. In another example, the PTR 210, and the STRs 212*a-b*, may exhibit functionality integrated as part of or into a television, a DVR, a computer such as a tablet computing device, or any other computing system or device, as well as variations thereof. Further, the PTR 210 and the network 220, together with the STRs 212*a-b* and televisions 214*a-c*, and possibly the computing devices 216*a-b* and access control server(s) 222, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still Other embodiments are possible.

In practice, the satellites 206*a-c* may each be configured to receive uplink signals 224*a-b* from the satellite uplink 204. In this example, the uplink signals 224*a-b* may contain one or more transponder streams of particular data or content, such as particular television channel, that is supplied by the service provider 202. For example, each of the respective uplink signals 224*a-b* may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*. Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206*a*, and a third, fourth, and fifth television channel may be carried on second carrier frequency over a first transponder of satellite 206*b*, or, the third, fourth, and fifth television channel may be carried on a second carrier frequency over a second transponder of satellite 206*a*, and etc.

The satellites 206*a-c* may further be configured to relay the uplink signals 224*a-b* to the satellite dish 208 as downlink signals 226*a-b*. Similar to the uplink signals 224*a-b*, each of the downlink signals 226*a-b* may contain one or more transponder streams of particular data or content, such as various encoded and/or at least partially electronically scrambled television channels, on-demand programming, etc., in accordance with an allotted carrier frequency and bandwidth. The downlink signals 226*a-b*, however, may not necessarily contain the same or similar content as a corresponding one of the uplink signals 224*a-b*. For example, the uplink signal 224*a* may include a first transponder stream containing at least a first group or grouping of television channels, and the downlink signal 226*a* may include a second transponder stream containing at least a second, different group or grouping of television channels. In other examples, the first and second group of television channels may have one or more television channels in common. In sum, there may be varying degrees of correlation between the uplink signals 224*a-b* and the downlink signals 226*a-b*, both in terms of content and underlying characteristics.

Continuing with the example implementation scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 226a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. In this example, the HD channel may be output to the television 214c in accordance with the HDMI/HDCP content protection technologies. Other embodiments are possible. For example, in some embodiments, the HD channel may be output to the television 214c in accordance with the MoCA® (Multimedia over Coax Alliance) home entertainment networking standard. Still other embodiments are possible.

Further, the PTR 210 may select via tuner, decode, and relay particular transponder streams to one or both of the STRs 212a-b, which may in turn relay particular transponder streams to a corresponding one of the television 214a and the television 214a for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Other embodiments are possible.

Still further, the satellite dish 208 and the PTR 210 may, respectively, be configured to receive, decode, and relay at least one premium television channel to one or both of the computing devices 216a-b. Similar to the above-examples, the television channel may generally be presented live, or from a recording as previously stored on the PTR 210, and may be output to one or both of the computing devices 216a-b in accordance with a particular content protection technology and/or networking standard. Other embodiments are possible.

Figure 3:
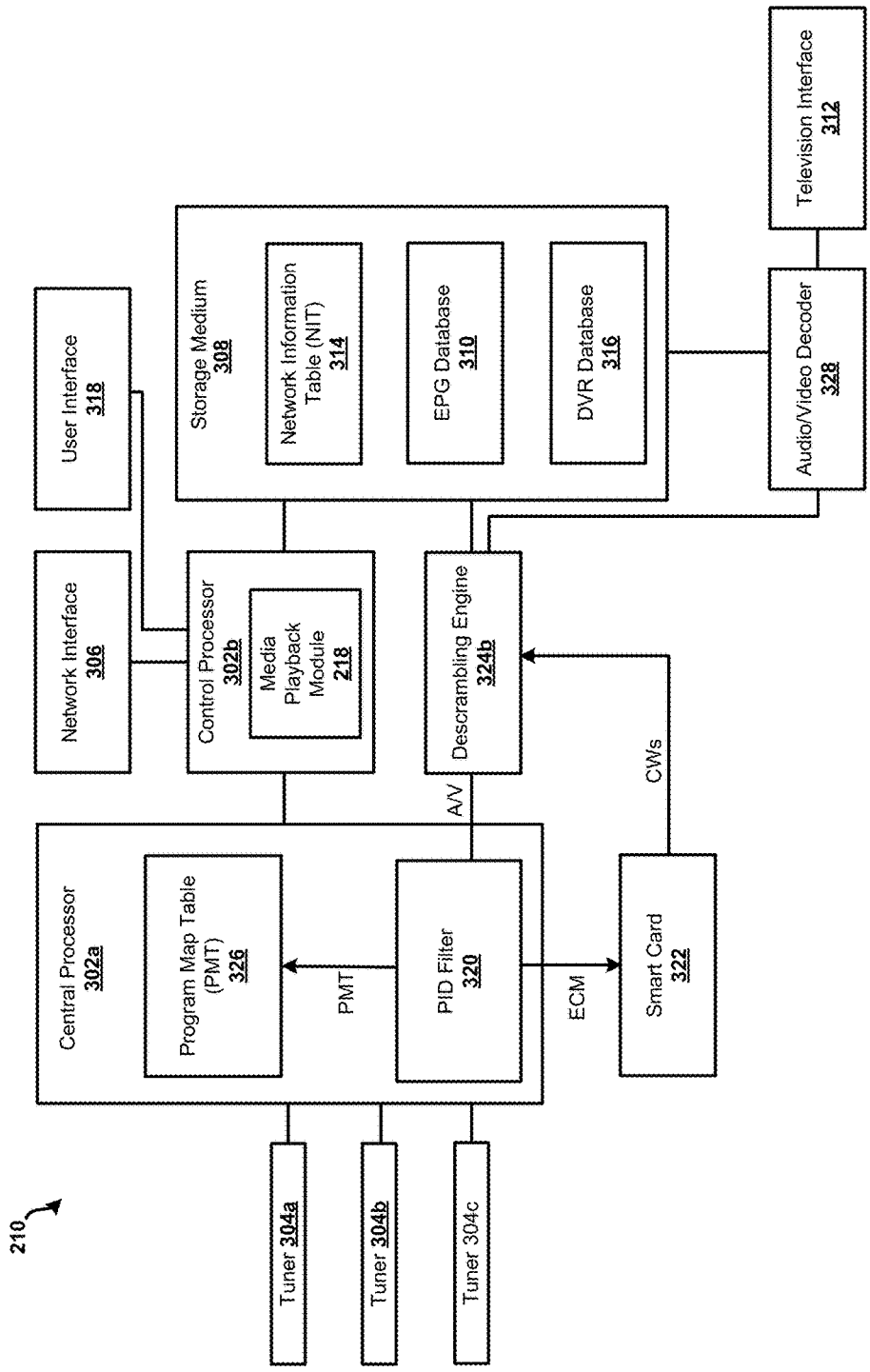
FIG. 3 shows an example block diagram of a television receiver of FIG. 2.

Referring now to FIG. 3, a simplified block diagram of the PTR 210 of FIG. 2 is shown in accordance with the present disclosure. In some embodiments, at least one of the STRs 212a-b may be configured in a manner similar to that of the PTR 210. In other embodiments, at least one of the STRs 212a-b may be configured to exhibit a reduced functionality as compared to the PTR 210, and may depend at least to a certain degree on the PTR 210 to implement certain features or functionality. In this example, the STRs 212a-b may be referred to as a "thin client."

For brevity, the PTR 210 is depicted in a simplified and conceptual form, and may generally include more or fewer elements or components as desired in accordance with the present disclosure. For example, the PTR 210 is shown in FIG. 3 to include the MPM module 218 as mentioned above in connection with FIG. 2. Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 210 may be configured to include any number of other various components or logical modules that are implemented in hardware, software, firmware, or any combination thereof, and such components or logical modules may or may not be implementation-specific.

In some embodiments, the PTR 210 and/or the STRs 212a-b comprises of a STB. In addition to being in the form of an STB, at least the PTR 210 may be incorporated into another device, such as the television 214c as shown in FIG. 2. For example, the television 214c may have an integrated television receiver that does not involve an external STB being coupled with the television 214c. A STB may contain some or all of the components of the PTR 210 and/or may be able to perform some or all of the functions of the PTR 210. Accordingly, instances in this document referring to a STB, and steps being performed by a STB, may also be performed, more generally, by the PTR 210 and/or STRs 212a-b.

Referring still to FIG. 3, the PTR 210 may include at least one processor 302, including a central processor 302a and a control processor 302b, a plurality of tuners 304a-c, at least one network interface 306, at least one non-transitory computer-readable storage medium 308, at least one EPG database 310, at least one television interface 312, at least one NIT (Networking Information Table) 314, at least one DVR database 316, at least one user interface 318, at least one PID filter 320, at least one smart card 322, at least one descrambling engine 324, at least one PMT (Program Map Table) 326, and at least one decoder 328. In other embodiments of the PTR 210, fewer or greater numbers of components may be present. Further, functionality of one or more components may be combined; for example, functions of the descrambling engine 324 may be performed by the central processor 302a. Still further, functionality of components may be spread among additional components. For example, the PID filter 320 may be handled by hardware and/or software separate from the PMT 326.

The processor 302 may include one or more specialized and/or general-purpose processors configured to perform processes such as tuning to a particular channel, accessing and displaying EPG information from the EPG database 310, and/or receiving and processing input from a user. For example, processor 302 may include one or more processors dedicated to decoding video signals from a particular format, such as MPEG, for output and display on a television and for performing decryption.

The control processor 302b may communicate with the central processor 302a. The control processor 302b may control the recording of television channels based on timers stored in the DVR database 316. The control processor 302b may initiate recording of a television channel by sending a record command along with an indication of the television channel to be recorded to the central processor 302a. The control processor 302b may not send a second record command, when additional recording is to begin at the same time, until an acknowledgement that recording of the first television channel has successfully been received and initiated by the central processor 302a. The control processor 302b may also provide commands to the central processor 302a when recording of a television channel is to cease. In addition to providing commands relating to the recording of television channels, the control processor 302b may provide commands to the central processor 302a that indicate television channels to be output to the decoder 328 for output to a presentation device, such as the television 214c for example.

The control processor 302b may also communicate with the network interface 306 and the user interface 318. The control processor 302b may handle in-coming data from the network interface 306 and the user interface 318. Additionally, the control processor 302b may be configured to output data via the network interface 306.

The tuners 304a-c may be used to tune to television channels, such as television channels transmitted via satellite or cable, such as satellites 206a-c. Each respective one of the tuner 304a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. Still another tuner (e.g., tuner 304c) may be used to check various television channels to determine if they are available or not. If multiple television channels transmitted on the same transponder stream are desired, a particular tuner (e.g., tuner 304a) may be used to receive the signal containing the multiple television channels for presentation and/or recording. The tuners 304a-c may receive commands from the central processor 302a. Such commands may instruct the tuners 304a-c which frequencies are to be used for tuning.

The network interface 306 may be used to communicate via an alternate communication channel with a television service provider. For example, the primary communication channel may be via satellite, which may be unidirectional to the STB, and the alternate communication channel, which may be bidirectional, may be via a network, such as the Internet. The PTR 210 may be able to communicate with the service provider 202 of FIG. 3 via a network, such as the Internet. This communication may be bidirectional. For example, data may be transmitted from the PTR 210 to the service provider 202, and from the service provider 202 to the PTR 210. The network interface 306 may be configured to communicate via one or more networks, such as the Internet, to communicate with the service provider 202. Information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. The storage medium 308 may store information related to the EPG database 310, the NIT 314, and/or the DVR database 316. Recorded television programs may be stored using the storage medium 308. The storage medium 308 may be partitioned or otherwise divided such that predefined amounts of the storage medium 308 are devoted to storage of omnibus channel files and user-selected television programs.

The EPG database 310 may store information related to television channels and the timing of programs appearing on such television channels. The EPG database 310 may be stored using the storage medium 308, which may be a hard drive. Information from the EPG database 310 may be used to inform users of what television channels or programs are popular and/or provide recommendations to the user. Information from the EPG database 310 may provide the user with a visual interface displayed by a television that allows a user to browse and select television channels and/or television programs for viewing and/or recording. Information used to populate the EPG database 310 may be received via the network interface 306 and/or via satellites, such as satellites 206a-c of FIG. 3 via the tuners 304a-c. For instance, updates to the EPG database 310 may be received periodically via satellite. The EPG database 310 may serve as an interface for a user to control DVR functions of the PTR 210, and/or to enable viewing and/or recording of multiple television channels simultaneously.

In addition to being used to provide users with information about scheduled programming, information from the EPG database 310 may be used to determine when television programs begin and end for the purposes of recording. For instance, when a channel-specific file is recorded that contains multiple television channels, the start and end of time of specific television programs within the channel-specific file may be based on the start and end times indicated in the EPG database 310. Other data may be stored within the EPG database 310 that may be useful in managing channel-specific files, such as series identifiers and episode identifiers, which may be used by a television service provider to identify particular television programs.

The decoder 328 may serve to convert encoded video and audio into a format suitable for output to a display device. For instance, the decoder 328 may receive MPEG video and audio from the storage medium 308, or the descrambling engine 324, to be output to a television. MPEG video and audio from the storage medium 308 may have been recorded to the DVR database 316 as part of a previously-recorded television program. The decoder 328 may convert the MPEG video and audio into a format appropriate to be displayed by a television or other form of display device and audio into a format appropriate to be output from speakers, respectively.

The television interface 312 may serve to output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

The NIT 314 may store information used by the PTR 210 to access various television channels. The NIT 314 may be stored using the storage medium 308. Information used to populate the NIT 314 may be received via satellite, or cable, via the tuners 304a-c and/or may be received via the network interface 306 from a service provider. As such, information present in the NIT 314 may be periodically updated. The NIT 314 may be locally-stored by the PTR 210 using the storage medium 308. Information that may be present in the NIT 314 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 314 may be divided into additional tables. For example, rather than the specific audio PIDs and video PIDs being present in the NIT 314, a channel identifier may be present within NIT 314 which may be used to look up the audio PIDs and video PIDs in another table, such as the PMT 326. For example, the PMT 326 may store information on audio PIDs and video PIDs for television channels that are transmitted on a transponder frequency.

Table 1 provides a simplified example of the MT 314 for several television channels. It should be understood that in other embodiments, many more television channels may be represented in the NIT 314. The NIT 314 may be at least periodically updated by a television service provider. As such, television channels may be reassigned to different satellites and/or transponders, and the PTR 210 may be able to handle this reassignment as long as the NIT 314 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 314, it may be possible to determine the proper satellite and transponder to which to tune for a particular television channel. In some embodiments, the NIT 314 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 314. The same PID may be reused on different transponders.

A DVR may permit a television channel to be recorded for a period of time. DVR functionality of the PTR 210 may be managed by the control processor 302b. The control processor 302b may coordinate the television channel, start time, and stop time of when recording of a television channel is to occur. The DVR database 316 may store information related to the recording of television stations. The DVR database 316 may store timers that are used by the control processor 302b to determine when a television channel should be tuned to and its programs recorded to the DVR database 316. However, other embodiments are possible. For example, in some embodiments, the storage medium 308 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 308 may be devoted to the DVR database 316. Timers may be set by a service provider and/or one or more users of the PTR 210.

DVR functionality of the control processor 302b may have multiple modes. For example, DVR functionality of the control processor 302b may be configured to record individual television programs selected by a user to the DVR database 316. Using the EPG database 310, a user may select a particular television program. Based on the date, time period, and television channel indicated by the EPG database 310, the control processor 302b may record the associated television program to the DVR database 316. In another example, the DVR database 316 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 202).

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the control processor 302b.

Referring back to tuners 304a-c, television channels received via satellite, or cable, may contain at least some scrambled data. Packets of audio and video may be scrambled to prevent unauthorized users, such as nonsubscribers, from receiving television programming without paying the television service provider. When one of the tuners 304a-c is receiving data from a particular transponder of a satellite, the transponder stream may be a series of data packets corresponding to multiple television channels. Each data packet may contain a PID, which, in combination with the NIT 314 and/or the PMT 326, can be determined to be associated with particular television channel. Particular data packets, referred to as ECMs may be periodically transmitted. ECMs may be associated with another PID and may be encrypted; the PTR 210 may use the smart card 322 to decrypt ECMs. Decryption of an ECM may only be possible when the user (e.g., PTR 210) has authorization to access the particular television channel associated with the ECM. When an ECM is determined to correspond to a television channel being stored and/or displayed, the ECM may be provided to the smart card 322 for decryption.

When the smart card 322 receives an encrypted ECM, the smart card 322 may decrypt the ECM to obtain some number of control words. In some embodiments, from each ECM received by the smart card 322, two control words are obtained. In some embodiments, when the smart card 322 receives an ECM, it compares the ECM to the previously received ECM. When the two ECMs match, the second ECM is not decrypted because the same control words would be obtained. In other embodiments, each ECM received by the smart card 322 is decrypted; however, when a second ECM matches a first ECM, the outputted control words will match; thus, effectively, the second ECM does not affect the control words output by the smart card 322. The smart card 322 may be permanently part of the PTR 210 or may be configured to be inserted and removed from PTR 210.

The central processor 302a may be in communication with the tuners 304a-c and the control processor 302b. The central processor 302a may be configured to receive commands from the control processor 302b. Such commands may indicate when to start/stop recording a television channel and/or when to start/stop causing a television channel to be output to a television. The central processor 302a may control the tuners 304a-c. The central processor 302a may provide commands to the tuners 304a-c that instruct the tuners which satellite, transponder, and/or frequency to tune to. From the tuners 304a-c, the central processor 302a may receive transponder streams of packetized data. As previously detailed, some or all of these packets may include a PID that identifies the content of the packet.

The central processor 302a may be configured to create at least one PID filter 320 that sorts packets received from the tuners 304a-c based on the PIDs. When a tuner is initially tuned to a particular frequency, such as a particular transponder of a satellite, a PID filter may be created based on a PID of PMT data. The PID of PMT data packets may be known because it is stored as part of the NIT 314. From the PMT data packets, the PMT 326 may be constructed by central processor 302a.

Table 2 provides an example extract of a PMT. The PMT 326 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---------|-----------|--------------------|--------------------|
| 4       | 1003      | 2383               | 2119               |
| 5       | 2993      | 2727               | 2728               |
| 7       | 9238      | 1233               | 0129               |
| 13      | 0012      | 9348               | —                  |

Accordingly, based on the information present in the PMT 326, the audio and video PIDs for specific television channels may be identified. A television channel may have multiple audio PIDs due to a second audio program, which may be in a different language.

The values provided in Table 2 are for example purposes only. Actual values may vary. Additional information or less information may also be stored in the PMT 326.

The PID filter 320 may be configured to filter data packets based on PIDs. In some embodiments, the PID filter 320 is created and executed by central processor 302a. In other embodiments, separate hardware may be used to create and execute multiple PID filters. Depending on a television channel selected for recording/viewing, a PID filter may be created to filter the video and audio packets associated with the television channel, based on the PID assignments present in the PMT 326. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 324 or the smart card 322; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 314, may be appropriately routed by the PID filter 320. At a given time, one or multiple PID filters may be executed by the central processor 302a.

The descrambling engine 324 may use the control words output by the smart card 322 in order to descramble video and/or audio corresponding to television channels for storage and/or presentation. Video and/or audio data contained in the transponder data stream received by the tuners 304a-c may be scrambled. Video and/or audio data may be descrambled by descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage in the DVR database 316 and/or to the decoder 328 for output to a television or other presentation equipment via the television interface 312.

For simplicity, the PTR 210 of FIG. 3 has been reduced to a block diagram; commonly known parts, such as a power supply, have been omitted. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules. Further, the components of the PTR 210 may be part of another device, such as built into a television. Also, while the PTR 210 may be used to receive, store, and present television channels received via a satellite, it should be understood that similar components may be used to receive, store, and present television channels via a cable network.

Figure 4:
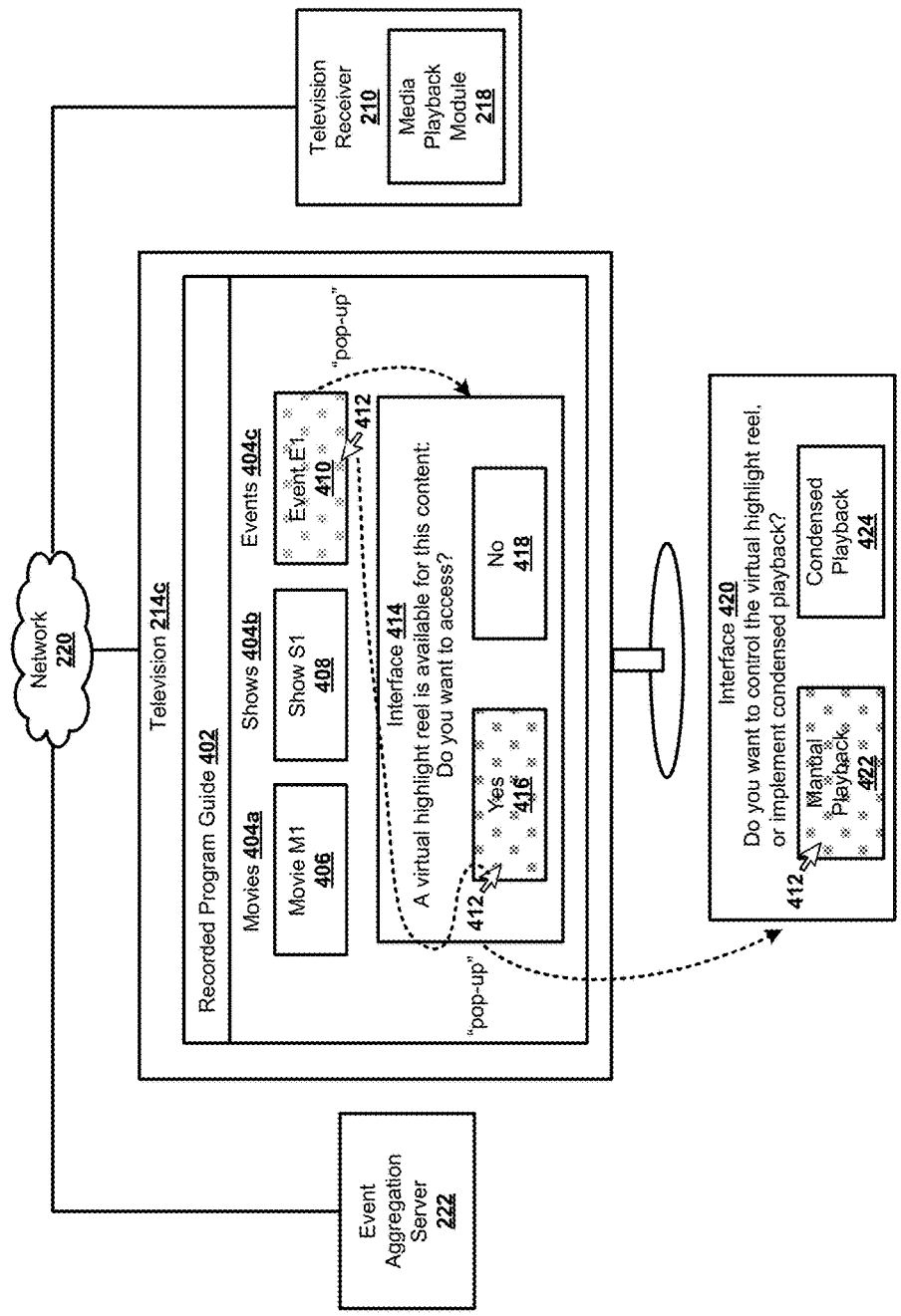
FIG. 4 shows example aspects of the example system of FIG. 2 in detail.

Referring now to FIG. 4, aspects of the example system 200 of FIG. 2 are shown in detail. More specifically, FIG. 4 shows the PTR 210, the television 214c, the network 220, and the event aggregation server 222 of FIG. 2. Other embodiments than those depicted in FIG. 4 are possible. For example, in some embodiments, the MPM module 218 of the PTR 210 may be wholly or at least partially located on one or more other components of the example system 200 of FIG. 2. For example, the MPM module 218 may be wholly or at least partially located on one or more of the STRs 212a-b. In another example, the MPM module 218 may be wholly or at least partially located on the event aggregation server 222. Such an implementation may free particular computing resources of the PTR 210, such that the PTR 210 may more efficiently perform various other tasks. Other advantages may be possible as well.

In practice, the MPM module 218 of the PTR 210 may be configured to output an RPG (Recorded Program Guide) 402 to and for presentation by at least the television 214a. In one aspect, the RPG 402 may enable a television viewer to more quickly consume recorded media content in accordance with the present disclosure. For example, the RPG 402 may present various information related to recorded media content as stored on or by the PTR 210. In general, the recorded media content may correspond to prior or previous programs or programming appearing on television channels broadcast by one or more of the satellites 306a-c.

For example, the RPG 402 may include a recorded movies column 404a that displays icons associated with recorded movies, such as a first icon 406 associated with a recorded Movie M1, a recorded shows column 404a that displays icons associated with recorded shows, such as a second icon 408 associated with a recorded Show S1, and a recorded events column 404c that displays icons associated with recorded sporting events, such as a third icon 410 associated with a recorded sporting Event E1. Other embodiments are possible. For example, more or fewer columns associated with particular media content organized as desired may be listed within the RPG 402. Such features may enable a television viewer to more quickly consume recorded media content in accordance with the present disclosure.

For example, as shown in FIG. 4, a television viewer may manipulate a cursor 412 using a pointing device (not shown), such as a remote control, to select the third icon 410 that is associated with the Event E1. Conventionally, the television viewer may perform such an action to select the Event E1 for immediate viewing on the television 214c. However, in accordance with the present disclosure, the MPM module 218 of the PTR 210 may be configured to output a first interface 414 to and for presentation within the RPG 402 in response to selection of the third icon 410 when a highlight reel that is associated with the Event E1 is available. In general, a highlight reel in accordance with the present disclosure may comprise of a list or listing of unique identifiers, where each one of the unique identifiers may generally mark or tag the temporal position of a particular highlight, or an event that is potentially interesting or significant, within the Event E1. An example of such a process to determine whether a particular highlight reel is available is discussed in connection with at least FIG. 8.

In the present example, and assuming that a highlight reel that is associated with the Event E1 is available, the television viewer may select a Yes icon 416 within the first interface 414 to enable access to the highlight reel, or otherwise select a No icon 418 within the first interface 414 so as to not enable access to the highlight reel that is associated with the Event E1. Upon selection of the icon 418, the PTR 210 may output for display by the television 214c the Event E1 for immediate viewing by the television viewer. Upon selection of the icon 416, however, the MPM module 218 of the PTR 210 may output a second interface 420 to and for presentation within the RPG 402. Here, the television viewer may select a Manual Playback icon 422 within the second interface 420 to enable the television viewer to have direct, personalized, control of the highlight reel that is associated with the Event E1, or otherwise select a Condensed Playback icon 424 within the second interface 420 so as to implement a hands-free playback of the highlight reel that is associated with the Event E1. Other embodiments are possible. For example, in some embodiments, the second interface 420 may include another icon (not shown) that when selected may permit the television viewer to export the highlight reel to another device for later playback. Still other embodiments are possible. An example of Manual Playback and Condensed Playback in accordance with the present disclosure is discussed further below in connection with FIG. 5.

Figure 5:
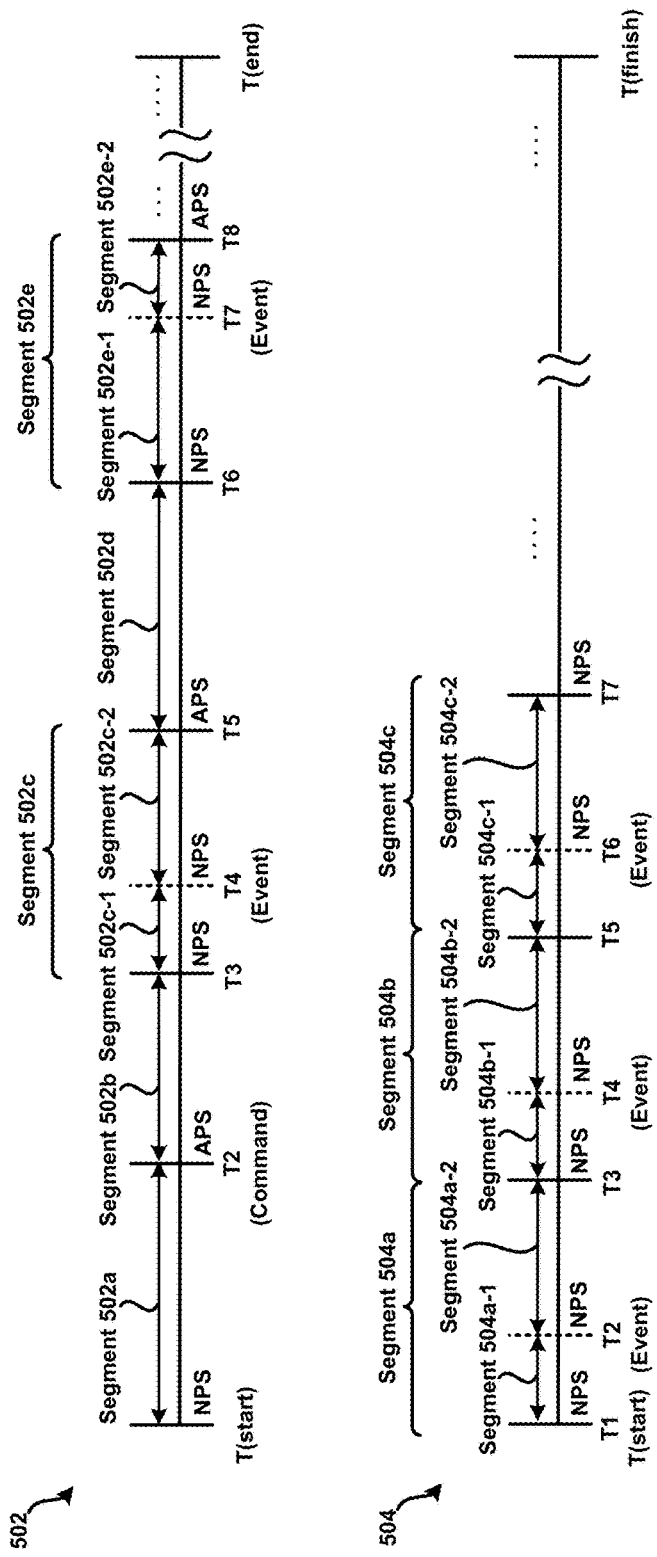
FIG. 5 shows a first and second timeline for playback of media content in accordance with the present disclosure.

For example, referring now to FIG. 5, a first example timeline 502 and a second example timeline 504 for playback of media content is shown in accordance with the present disclosure. The first timeline 502 and the second timeline 504 may, for example, be associated with the Event E1 discussed above in connection with FIG. 4. More specifically, the first timeline 502 may correspond to an example of Manual Playback of highlights associated with the Event E1, and the second timeline 504 may correspond to an example of Condensed Playback of highlights associated with the Event E1. Other embodiments are possible.

The first timeline 502 may include a start time T(start) and an end time T(end). Between the start time T(start) and the end time T(end), there may be a number of content segments 502a-e, the duration of each which may be defined as being bounded by two specific times. For example, the content segment 502a is shown bounded by the start time T(start) and a time T2. In this example, the start time T(start) may correspond to the beginning of playback of the Event E1. During the content segment 502a, playback of the Event E1 may occur at normal speed, such as about 30 FPS for example. Playback of the Event E1 at normal speed may occur until time T2. Here, time T2 may correspond to the start of playback of the Event E1 at a speed greater than the normal speed, such as about 48 FPS for example. In one embodiment, this accelerated playback may be initiated by a television viewer pushing a dedicated button of a remote control to accelerate playback of the Event E1. For example, action within the Event E1 may be at a lull, and the television user may wish to more quickly watch the Event E1.

The content segment 502b is shown bounded by the time T2 and a time T3. Playback of the Event E1 may occur at a speed greater than the normal speed during the content segment 502b. Playback of the Event E1 at greater than normal speed may occur until time T3. Here, time T3 may correspond to the start of playback of the Event E1 at the normal speed. In one embodiment, this resumed playback of the Event E1 at the normal speed may be automatically implemented based on detection of an upcoming event within the Event E1 that is marked as potentially interesting or significant.

For example, the content segment 502c is shown bounded by the time T3 and a time T5. The content segment 502c itself is partitioned into a first segment 502c-1 and a second segment 502c-2, separated by an event occurring at a time T4. The event occurring at time T4 may correspond to a highlight within the Event E1, such as a goal in a soccer match for example. In this example, the temporal difference between the time T4 and the time T3 may be configurable and predefined so that the first segment 502c-1 may be likened to a buffer window, so that a television viewer may watch a portion of play of the soccer match leading up to goal at normal speed. Similarly, the temporal difference between the time T5 and the time T4 may be configurable and predefined so that the second segment 502c-2 may be likened to a buffer window, so that a television viewer may watch a portion of play of the soccer match following the goal at normal speed.

The content segment 502d is shown bounded by the time T5 and a time T6. Playback of the Event E1 may occur at a speed greater than the normal speed during the content segment 502d. In one embodiment, this resumed playback of the Event E1 at the speed greater than normal speed may be automatically implemented based expiration or termination of the buffer window of second segment 502c-2. However, other embodiments are possible. For example, in one embodiment, accelerated playback within content segment 502d may be initiated by a television viewer pushing a dedicated button of a remote control to accelerate playback of the Event E1.

Playback of the Event E1 at greater than normal speed may occur until time T6. Here, time T6 may correspond to the start of playback of the Event E1 at the normal speed. Similar to the above-description in relation to the content segment 502c, this resumed playback of the Event E1 at the normal speed may in one embodiment be automatically implemented based upon detection of an upcoming event within the Event E1 that is marked as potentially interesting or significant.

For example, the content segment 502e is shown bounded by the time T6 and a time T8. The content segment 502e itself is partitioned into a first segment 502e-1 and a second segment 502e-2, separated by an event occurring at a time T7. The event occurring at time T7 may correspond to a highlight within the Event E1, such as a foul in a soccer match for example. In this example, the temporal difference between the time T7 and the time T6 may be configurable and predefined so that the content segment 502e-1 may be likened to a buffer window, so that a television viewer may watch a portion of play of the soccer match leading up to foul at normal speed. Similarly, the temporal difference between the time T8 and the time T7 may be configurable and predefined so that the content segment 502e-2 may be likened to a buffer window, so that a television viewer may watch a portion of play of the soccer match following the foul at normal speed.

The example Manual Playback as described in connection with the first timeline 502 may be implemented until the time T(end), which may correspond to the ending or end of the Event E1. In practice, a computing system or device, such as a television receiver, may be configured to detect an upcoming event within the Event E1 that is marked as potentially interesting or significant, and then modify playback of the Event E1 from a speed greater than a normal speed to the normal speed. Subsequently, when the potentially interesting or significant event has passed, the computing system or device may be configured to modify playback of the Event E1 from the normal speed to the speed greater than the normal speed, in a manner as described above in connection with at least FIG. 1 and FIG. 5.

In general, modification of playback speed as implemented by the computing system or device may be enabled by a list or listing list of unique identifiers associated with particular recorded media content, such as the Event E1 of the above-example. This information may be embedded within data associated with the particular recorded media content, or read from a separate file, or some other method. Continuing with the example of the first timeline 502 of FIG. 5, such a list or listing may take the form as shown in the following Table 3:

TABLE 3

| Event | Time of Occurrence in Recorded Content | Pre-event buffer | Post-event buffer |
|---|---|---|---|
| Event A | T4 | 60 seconds | 120 seconds |
| Event B | T7 | 20 seconds | 60 seconds |
| ... | ... | ... | ... |

The values provided in Table 3 are for example purposes only.

As mentioned above, the second timeline 504 as shown in FIG. 5 may correspond to an example of Condensed Playback of highlights associated with the Event E1. In general, Condensed Playback as demonstrated by the second timeline 504 is different than Manual Playback as demonstrated by the first timeline 502, at least because substantially no user input is needed in the Condensed Playback scenario, following selection of the Condensed Playback icon 424 within the second interface 420 as described above in connection with FIG. 4.

For example, the second timeline 504 may include a start time T(start) and a finish time T(finish). Between the start time T(start) and the finish time T(finish) there may be a number of content segments 504a-c, the duration of each which may be defined as being bounded by two specific times. For example, the content segment 504a is shown bounded by start time T(start) and a time T3, the content segment 504b is shown bounded by the time T3 and a time T5, and the content segment 504c is shown bounded by the time T5 and a time T7.

In this example, the start time T(start) may correspond to the beginning of playback of the Event E1. During the content segment 504a, playback of the Event E1 may occur at normal speed, such as about 30 FPS for example. Playback of the Event E1 at normal speed may also occur during the content segment 504b and the content segment 504c.

The content segment 504a itself is partitioned into a first segment 504a-1 and a second segment 504a-2, separated by an event occurring at a time T2. The event occurring at time T2 may correspond to a highlight within the Event E1, such as a home run in a baseball game for example. In this example, the temporal duration of the first segment 504a-1 may be configurable and predefined so that the first segment 504a-1 may be likened to a buffer window, so that a television viewer may watch a portion of play of the baseball game leading up to home run (and the home run itself) at normal speed. Similarly, the temporal difference between the time T3 and the time T2 may be configurable and predefined so that the second segment 504c-2 may be likened to a buffer window, so that a television viewer may watch a portion of play of the baseball game following the home run at normal speed.

The content segment 504b itself is partitioned into a first segment 504b-1 and a second segment 504b-2, separated by an event occurring at a time T4. The first segment 504b-1 and the second segment 504b-2 may be configurable and defined such as to allow for a buffer window prior to and following the event occurring at the time T4. Similarly, the content segment 504c itself is partitioned into a first segment 504c-1 and a second segment 504c-2, separated by an event occurring at a time T6. The first segment 504c-1 and the second segment 504c-2 may be configurable and defined such as to allow for a buffer window prior to and following the event occurring at the time T6.

The example Condensed Playback such as described in connection with the second timeline 504 may be implemented until the time T(finish), which may correspond to an end or ending of highlights that are marked as potentially interesting or significant within the Event E1. In practice, a computing system or device, such as a television receiver, may be configured to access a list or listing list of unique identifiers associated with the Event E1, and then playback the Event E1 as a consecutive sequence of highlights based on the list or listing. In general, this information may be embedded within data associated with particular recorded media content, such as the Event E1, or read from a separate file, or some other method. Continuing with the example of the second timeline 504 of FIG. 5, such a list or listing may take the form as shown in the following Table 4:

TABLE 4

| Event | Time of Occurrence in Recorded Content | Pre-event buffer | Post-event buffer |
|---|---|---|---|
| Event A | T2 | 15 seconds | 35 seconds |
| Event B | T4 | 120 seconds | 60 seconds |
| Event C | T6 | 45 seconds | 20 seconds |
| ... | ... | ... | ... |

The values provided in Table 4 are for example purposes only.

As shown in Table 3 and Table 4, and discussed in the context of FIG. 5, Event A, Event B, and Event C, may correspond to highlights within particular media content. Those highlights may be of the form or type of particular events, such as a goal in a soccer game for example. However, it is contemplated that a highlight may be of any particular form or type as desired. For example, a highlight could be of multiple subtypes like #tags, where one could play only goals, and skip fouls and scoring opportunities. These highlights could be further expanded to be used to categorize events like sitcoms, where only the funniest bits (#funny) are played back for either a single sitcom, all sitcoms, or sitcoms that the user likes, from a preference list for example. Still other embodiments are possible.

Figure 6:
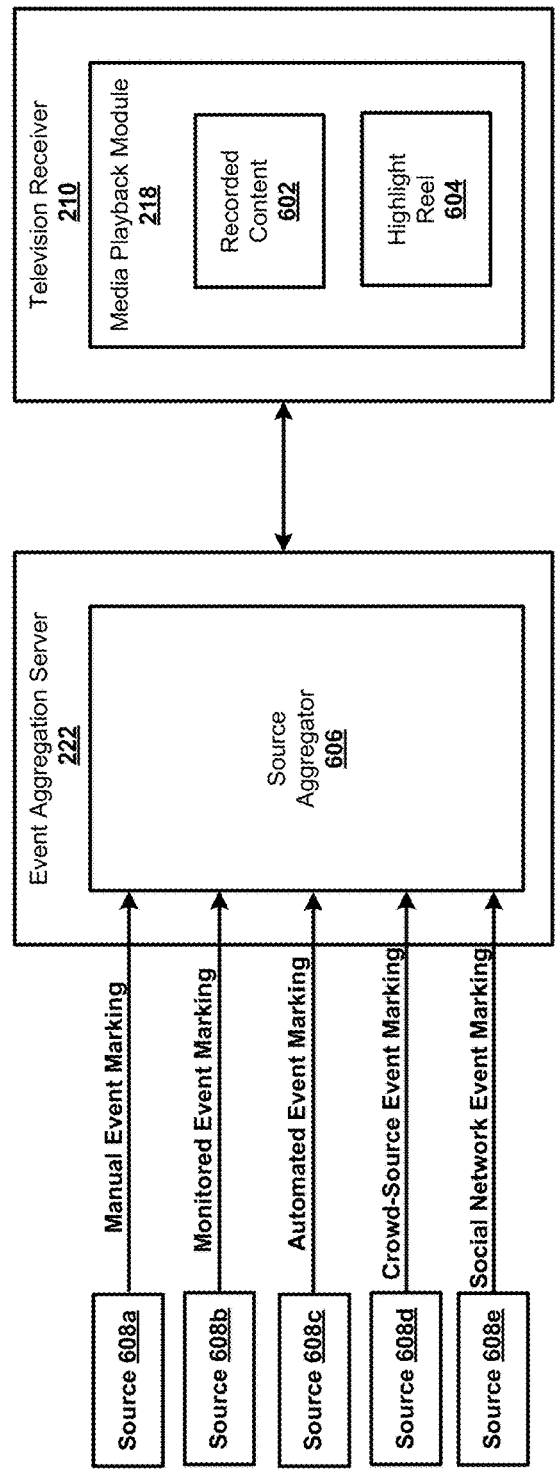
FIG. 6 shows further example aspects of the example system of FIG. 2 in detail.

Referring now to FIG. 6, further aspects of the example system 200 of FIG. 2 are shown in detail. More specifically, FIG. 6 shows the PTR 210 and the event aggregation server 222 of FIG. 2. In this example, the MPM module 218 of the PTR 210 is shown to include a recorded content module 602 and a highlight reel module 604, and the event aggregation server 222 is shown to include a source aggregator 606. Other embodiments than those depicted in FIG. 6 are possible. For example, in some embodiments, the MPM module 218 of the PTR 210 may be wholly or at least partially located on one or more other components of the example system 200 of FIG. 2. For example, the MPM module 218 may be wholly or at least partially located on one or more of the STRs 212a-b. In another example, the MPM module 218 may be wholly or at least partially located on the event aggregation server 222. Such an implementation may free particular computing resources of the PTR 210, such that the PTR 210 may more efficiently perform various other tasks. Other advantages may be possible as well.

In practice, the MPM module 218 may access the highlight reel module 604 during playback of recorded content as contained within the recorded content module 602 as part of a Manual Playback scenario or Condensed Playback scenario, such as described in connection with at least FIG. 5. For example, the MPM module 218 may access the highlight reel module 604 during playback of the Event E1 as contained within the recorded content module 602 as part of a Manual Playback or Condensed Playback scenario. In this and other examples, the highlight reel module 604 may contain a list or listing that may be accessed by the MPM module 218 during or prior to playback of the Event E1, so as to enable implementation of the Manual Playback or Condensed Playback of the present disclosure. Here, it is contemplated that there are many different methods that may be used to generate the list or listing that may be accessed by the MPM module 218 during or prior to playback of the Event E1.

For instance, also shown in FIG. 6 are a plurality of sources 608a-e, each of which may be accessed by the source aggregator 606 of the event aggregation server 222 to populate the list or listing that may be accessed by the MPM module 218 during or prior to playback of the Event E1 for example. In particular, the source aggregator 606 of the event aggregation server 222 may generate and transfer the list or listing to the PTR 210 so that the MPM module 218 may access the list or listing during or prior to playback of the Event E1. It will be appreciated that the Event E1 is used throughout for example purposes only.

For example, the source aggregator 606 of the event aggregation server 222 may access or receive manual event marking information from the source 608a. In this example, the manual event marking information may correspond to a marking or tagging of the temporal position of a particular highlight, or an event that is potentially interesting or significant, within the Event E1 by manual input from an individual. For example, during an original broadcast of the Event E1, an employee of the service provider 202 of FIG. 2 for example, may manually tag in time a portion of play of the Event E1, such as a goal or touchdown for example. This tag may be aggregated by the source aggregator 606 of the event aggregation server 222 into a particular list or listing that is then associated with the Event E1. Other information may then be associated with this tag by the source aggregator 606 or by some other entity. For example, a pre-event buffer parameter and/or a post-event buffer parameter may be associated with this tag. In this example, the list or listing may take the form as shown above in Table 3. Other embodiments are possible.

The source aggregator 606 of the event aggregation server 222 may alternately or additionally access or receive monitored event marking information from the source 608b. In this example, the monitored event marking information may correspond to a marking or tagging of the temporal position of a particular highlight, or an event that is potentially interesting or significant, within the Event E1 as mined or monitored from an online source. An example of an online source may include ESPN Live for example, where transcripts of live games may be posted. For example, during an original broadcast of the Event E1, a webcrawler may access and report events of the Event E1 based on keywords such as a goal or touchdown for example. The keywords may be associated with a particular time of the recorded Event E1 so that the video stream associated with the Event E1 may be tagged accordingly. The tags may be aggregated by the source aggregator 606 of the event aggregation server 222 into a particular list or listing that is then associated with the recorded Event E1. Other information may then be associated with the tags by the source aggregator 606 or by some other entity. For example, a pre-event buffer parameter and/or a post-event buffer parameter may be associated with a tag. In this example, the list or listing may take the form as shown above in Table 3. Other embodiments are possible.

The source aggregator 606 of the event aggregation server 222 may alternately or additionally access or receive automated event marking information from the source 608c. In this example, the monitored event marking information may correspond to a marking or tagging of the temporal position of a particular highlight, or an event that is potentially interesting or significant, within the Event E1 as derived by machine from the audio and/or video stream associated with the Event E1. For example, during an original broadcast of the Event E1, at least one computing system or device may access and report events of the Event E1 based on keywords such as a goal or touchdown for example. As another example, during an original broadcast of the Event E1, at least one computing system or device may access and report events of the Event E1 based on volume and/or inflection of audio associated with a crowd and/or announcer.

As another example, during an original broadcast of the Event E1, at least one computing system or device may access and report events of the Event E1 based on particular graphics, such as a scorecard or changes in score as identified within a streaming ticker typically positioned and scrolling across the top or bottom of a television screen. Such information may be associated with a particular time of the sporting event so that the stream associated with the Event E1 may be tagged accordingly. The tags may be aggregated by the source aggregator 606 of the event aggregation server 222 into a particular list or listing that is then associated with the Event E1. Other information may then be associated with the tags by the source aggregator 606 or by some other entity. For example, a pre-event buffer parameter and/or a post-event buffer parameter may be associated with particular tags. In this example, the list or listing may take the form as shown above in Table 3. Other embodiments are possible.

The source aggregator 606 of the event aggregation server 222 may alternately or additionally access or receive crowd-source event marking information from the source 608d. In this example, the crowd-source event marking information may correspond to a marking or tagging of the temporal position of a particular highlight, or an event that is potentially interesting or significant, within the Event E1 as derived from actions and/or input from one or more particular groups of individuals. An example of a group of a individuals may include a customer base of a particular satellite-based content distribution network and/or service provider, such as the service provider 202 of FIG. 2. Here, actions and/or input associated with the Event E1 may be accessed and reported. For example, as an interesting event occurs during playback of the Event E1 from a file, a natural tendency of a television viewer may be to skip back or rewind to a specific part of the stream. User usage statistics may be anonymously uploaded to the event aggregation server 222, where the source aggregator 606 may detect these hot spots in the data so that if a number of users or television viewers have consistently accessed that location as part of a skip back or rewind process, it may be assumed that there is likely an event of interest there.

Many other user actions and/or inputs may also be used to identify potentially interesting event as well, and such information may be associated with a particular time of the sporting event so that the stream associated with the Event E1 may be tagged accordingly. The tags may be aggregated by the source aggregator 606 of the event aggregation server 222 into a particular list or listing that is then associated with the Event E1. Other information may then be associated with the tags by the source aggregator 606 or by some other entity. For example, a pre-event buffer parameter and/or a post-event buffer may be associated with a tag. In this example, the list or listing may take the form as shown above in Table 3. Other embodiments are possible.

The source aggregator 606 of the event aggregation server 222 may alternately or additionally access or receive social network event marking information from the source 608e. In this example, the social network event marking information may correspond to a marking or tagging of the temporal position of a particular highlight, or an event that is potentially interesting or significant, within the Event E1 based on trending information accessed from an online social network. An example of an online source may include Twitter, for example, where textual comments may be posted. For example, during an original broadcast of the Event E1, a webcrawler may access and report events of the Event E1 based on What's Trending posts to Twitter. For example, the What's Trending post(s) may include a thread associated with the Event E1, where the thread may include comments including keywords such as a goal or touchdown for example. The keywords may be associated with a particular time of the sporting event and so that video stream associated with the Event E1 may be tagged accordingly.

Other trends from other social networks, such as Likes on Facebook, may be monitored and associated with a particular time of the sporting event so that the video stream associated with the Event E1 may be tagged accordingly. In this manner, keywords, trends, etc., as derived from the source 608e may be associated with a particular time of the Event E1 so the video stream associated with the Event E1 may be tagged accordingly. The tags may be aggregated by the source aggregator 606 of the event aggregation server 222 into a particular list or listing that is then associated with the Event E1. Other information may then be associated with the tags by the source aggregator 606 or by some other entity. For example, a pre-event buffer parameter and/or a post-event buffer parameter may be associated with a tag. In this example, the list or listing may take the form as shown above in Table 3. Other embodiments are possible.

The respective sources 608a-e provide a number of examples by which information may be acquired to generate the list or listing in accordance with this disclosure. As mentioned above, the source aggregator 606 of the event aggregation server 222 may alternately or additionally access or receive event marking information from the respective sources 608a-e. In event the source aggregator 606 accesses or receives event marking information from multiple ones of the respective sources 608a-e, that information may be aggregated and used to generate a more statistically relevant list or listing. For example, an Event A may not be marked as potentially interesting or significant if Event A includes only a tens of reports across multiple sources that suggest Event A is potentially interesting or significant. In contrast, an Event B may be marked as potentially interesting or significant if Event B includes thousands of reports across multiple sources that suggest Event B is potentially interesting or significant. Other embodiments are possible. Further, it is contemplated that event aggregation server 222 may not be the only way to detect the highlights. For example, in an embodiment, each television receiver in the field may calculate its own highlight reel based on an algorithm, without consulting with a central server. In another embodiment, each television receiver in the field may collectively communicate in a peer-to-peer faction to create a virtual reel, without consulting with a central server.

Figure 7:
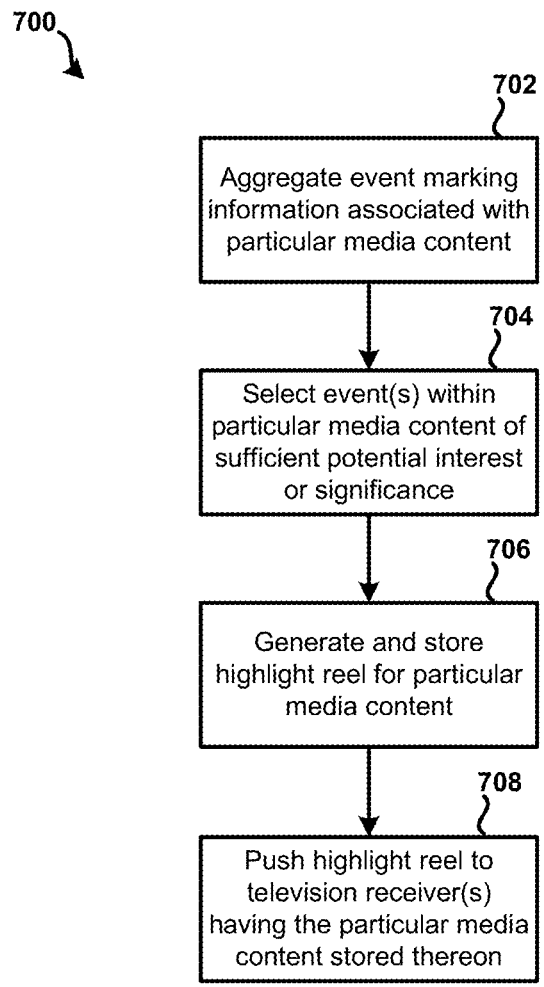
FIG. 7 shows a second example method in accordance with the present disclosure.

Referring now to FIG. 7, a second example method 700 is shown in accordance with the present disclosure. In general, the example method 700 as described may be performed on or by at least one computing system or device in a networked computing environment. An example of such a computing system or device may include a television receiver, and an example of such a networked computing environment may include a content distribution system incorporating various aspects of a satellite-based content distribution network, such as discussed in connection with at least FIG. 2.

At step 702, a computing system may aggregate event marking information associated with particular media content. For example, the source aggregator 606 of the event aggregation server 222 may aggregate a plurality of event marking information that is associated with the Event E1 in a manner similar to that described in connection with FIG. 6. Other embodiments are possible.

At step 704, the computing system may select or otherwise identify particular events within the particular media content that are of sufficient potential interest or significance. For example, the source aggregator 606 may mark particular portions of the Event E1 based on numbers of reports or feedback associated therewith. For example, the source aggregator 606 may mark or tag a portion of the Event E1 when that portion of the Event E1 has numbers of reports or feedback associated therewith greater than a predetermined and configurable threshold value, such as 100 favorable reports or feedback for instance. Other embodiments are possible.

At step 706, the computing system may generate and store a particular list, or listing, or highlight reel, that is associated with the particular media content. For example, the source aggregator 606 may generate and store a highlight reel that is associated with the Event E1 having a form similar to that shown above in Table 3. Other embodiments are possible.

At step 708, the computing system may push the particular list, or listing, or highlight reel, to particular television receivers having the particular media content stored thereon. For example, the source aggregator 606 may transfer a highlight reel that is associated with the Event E1 having a form similar to that shown above in Table 3 to the PTR 210. Other embodiments are possible. Actions associated with step 708 are described in further detail in connection with at least FIG. 8.

Figure 8:
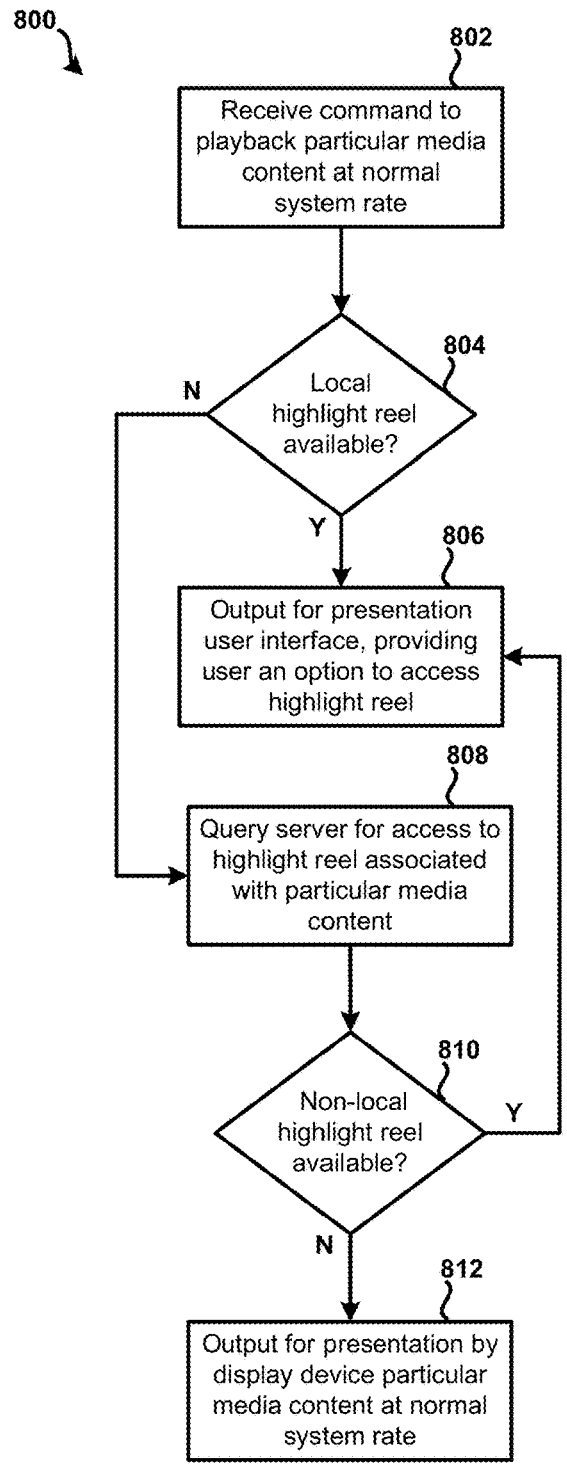
FIG. 8 shows a third example method in accordance with the present disclosure.

For example, referring now to FIG. 8, a third example method 800 is shown in accordance with the present disclosure. In general, the example method 800 as described may be performed on or by at least one computing system or device in a networked computing environment. An example of such a computing system or device may include a television receiver, and an example of such a networked computing environment may include a content distribution system incorporating various aspects of a satellite-based content distribution network, such as discussed in connection with at least FIG. 2.

At step 802, a computing system may receive a command to playback particular media content at a normal rate. For example, a television viewer may push play using a remote control to access the Event E1 for viewing on the television 214c, such as a particular hockey game for instance. In response, the PTR 210 may playback the recorded hockey game to the television 214c at a typical or normal frame rate, such as about 30 FPS for instance. Other embodiments are possible.

At step 804, the computing system may access a local hard drive or memory partition to determine whether a highlight reel associated with the particular media content is available. For example, the PTR 210 may query the storage medium 308 to determine whether a list or listing associated with the particular hockey game having a form similar to that shown above in Table 3 for instance is available. Other embodiments are possible.

Flow within the example method 800 may branch to step 806 when a highlight reel associated with the particular media content is determined available at step 804. At step 806, the computing system may output for presentation by a display device a user interface that provides an option for a user to access the highlight reel. For example, the PTR 210 may output for display by the television 214c the first interface 414. Other embodiments are possible.

Flow within the example method 800 may branch to step 808 when a highlight reel associated with the particular media content is determined unavailable at step 804. At step 808, the computing system may query a delocalized server for access to a highlight reel that is associated with the particular media content determined unavailable at step 804. For example, the PTR 210 may query the event aggregation server 222 to determine whether a list or listing associated with the particular hockey game having a form similar to that shown above in Table 3 for instance is available. Other embodiments are possible.

At step 810, the computing system may determine whether a highlight reel associated with the particular media content is available from the server. Flow within the example method 800 may branch to step 806 when a highlight reel associated with the particular media content is determined available at step 810. Here, the computing system may output for presentation by a display device a user interface that provides an option for a user to access the highlight reel, as described above.

Flow within the example method 800 may branch to step 812 when a highlight reel associated with the particular media content is determined unavailable at step 810. At step 812, the computing system may output for presentation by a display device the particular media content for immediate viewing by a user at a normal rate. Such an implementation at step 812 may be consistent with a conventional operation to playback particular media content for immediate viewing in response to selection of the particular media for doing so.

Features or aspects of the present disclosure as discussed above may be beneficial or advantages in many respects. Watching sports on TV is different than watching other types of programs like movies or newscasts. There may be less of a need to watch sports in a linear way due to the lack of dialogue or a plot. Features or aspects of the present disclosure may be especially applicable in sporting scenarios where user may be much more likely seeking highlights (scoring opportunities, touchdowns, big tackles) and more likely to want to view these highlights repeatedly. In many instances, particular DVR systems may not distinguish between what kind of event is being played, and providing a set of sport watching tools similar to those described above to the end user may increase customer loyalty, market awareness. and give the provider a competitive advantage. Further, using all frames to display to fast forward may make following sports in high speed an enriched experience. Sports like soccer or hockey where the ball or puck is constantly moving but with lots of play build up are of interest, as the user can watch uninteresting moments in high quality high-speed, and can go to normal playback once an interesting play is about to start. This may also provide the ability for a user to quickly update social media status based on events happening on the game.

Features or aspects of the present disclosure as discussed above may be beneficial or advantages in other respects as well. For example, a user who is a fan of a team may get highlights for that team. Also, a user could get highlights for all teams in a particular division, such as the American League East division in American baseball. Further, hard drive space may be saved since in some embodiments only highlights may be stored to the hard drive, and not an entire event. Still further, a user who may not be able to watch every game may still get highlight reels of missed games. The highlight reel could be accessed by a television or a mobile device, for example, in an on-demand scenario.

Figure 9:
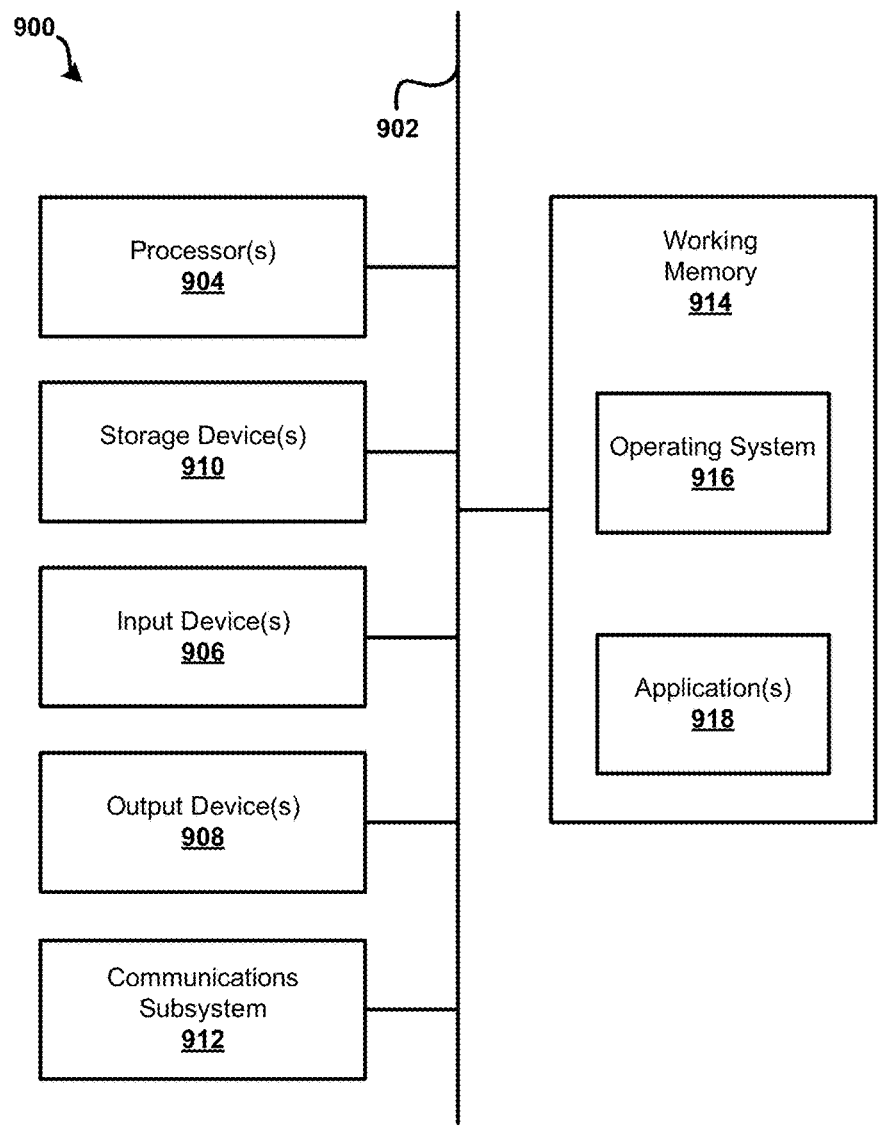
FIG. 9 shows an example computing system or device.

FIG. 9 shows an example computer system or device 900 in accordance with the present disclosure. An example of a computer system or device includes an enterprise server, blade server, desktop computer, laptop computer, tablet computer, personal data assistant, smartphone, feature phone, gaming console, set-top-box, television receiver, and/or any other type of machine configured for performing calculations. The computer system 900 may be wholly or at least partially incorporated as part of previously-described computing devices, such as the PTR 210, STRs 212-b, televisions 214a-c, computing devices 216a-b, and event aggregation server 222 as described above. The example computer device 900 may be configured to perform and/or include instructions that, when executed, cause the computer system 900 to perform the method of FIG. 1, FIG. 7, and FIG. 8. Further, the example computer device 900 may be configured to perform and/or include instructions that, when executed, cause the computer system 900 to instantiate and implement functionality of the MPM module 218 described above.

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which can include without limitation a remote control, a mouse, a keyboard, and/or the like; and one or more output devices 908, which can include without limitation a presentation device (e.g., television), a printer, and/or the like.

The computer system 900 may further include (and/or be in communication with) one or more non-transitory storage devices 910, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 900 might also include a communications subsystem 912, which can include without limitation a modem, a network card (wireless or wired), an infrared communication device, a wireless communication device, and/or a chipset (such as a Bluetooth™ device, an 902.11 device, a WiFi device, a WiMax device, cellular communication facilities (e.g., GSM, WCDMA, LTE, etc.), and/or the like. The communications subsystem 912 may permit data to be exchanged with a network (such as the network described below, to name one example), other computer systems, and/or any other devices described herein. In many embodiments, the computer system 900 will further comprise a working memory 914, which may include a random access memory and/or a read-only memory device, as described above.

The computer device 900 also can comprise software elements, shown as being currently located within the working memory 914, including an operating system 916, device drivers, executable libraries, and/or other code, such as one or more application programs 918, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 900) to perform methods in accordance with various embodiments of the invention. According to a set of embodiments, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms machine-readable medium (media) and computer-readable medium (media), as used herein, may refer to any medium that participates in providing data that causes a machine to operate in a specific fashion. In an embodiment implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, by a television receiver, media content;
   storing, by the television receiver, the received media content;
   processing, by the television receiver, a listing associated with the media content to facilitate playback content at a specified frame rate of only highlights from the media content, the listing comprising:
      first time information corresponding to a first event occurring in the playback of the media content, where the first time information comprises:
         a first pre-event time prior to occurrence of the first event in the playback of the media content; and
         a first post-event time subsequent to the occurrence of the first event in the playback of the media content;
      second time information corresponding to a second event occurring in the playback of the media content, where the second time information comprises:
         a second pre-event time prior to occurrence of the second event in the playback of the media content; and
         a second post-event time subsequent to the occurrence of the second event in the playback of the media content;
      the first event and the second event identified as potentially interesting or significant over other portions of the media content based at least in part on differentiating a threshold number of actions attributed to one or more particular groups of individuals;
   identifying, by the television receiver, a first position during the playback of the media content associated with the first pre-event time prior to occurrence of the first event;
   automatically adjusting, by the television receiver without user input, the playback of the media content to the identified first position, and causing the playback of the media content at the specified frame rate from the identified first position until a subsequent position during the playback that corresponds to the first post-event time;
   identifying, by the television receiver, a second position during the playback of the media content associated with the second pre-event time prior to occurrence of the second event; and
   automatically adjusting, by the television receiver without user input, the playback of the media content to the identified second position, and causing the playback of the media content at the specified frame rate from the identified second position until a subsequent position during the playback that corresponds to the second post-event time.

2. The method of claim 1, wherein one or both of the first event and the second event were identified as potentially interesting or significant over other portions of the media content based at least in part on one or more keywords identified in an audio stream of the media content.

3. The method of claim 1, wherein one or both of the first event and the second event were identified as potentially interesting or significant over other portions of the media content based at least in part on one or more volume and/or inflection aspects identified in an audio stream of the media content.

4. The method of claim 1, wherein one or both of the first event and the second event were identified as potentially interesting or significant over other portions of the media content based at least in part on particular graphics identified in a video stream of the media content.

5. The method of claim 1, wherein one or both of the first event and the second event were identified as potentially interesting or significant over other portions of the media content based at least in part on the actions that comprise actions attributed to viewers of the media content that correspond to repeat playbacks of the first event and/or the second event.

6. The method of claim 1, wherein one or both of the first event and the second event were identified as potentially interesting or significant over other portions of the media content based at least in part on the actions that comprise user inputs via one or more social networks.

7. The method of claim 1, wherein one or both of the first event and the second event were identified as potentially interesting or significant over other portions of the media content based at least in part on information from a plurality of different types of event marking sources comprising two or more of: a manual marking source; a monitored event marking source; an automated event marking source; and/or a crowdsourcing marking source.

8. A computing system, comprising:
one or more processors; and
a memory communicatively coupled with and readable by the one or more processors and having stored therein processor-readable instructions which, when executed by the one or more processors, cause the one or more processors to:
receive media content;
store the received media content;
process a listing associated with the media content to facilitate playback content at a specified frame rate of only highlights from the media content, the listing comprising:
first time information corresponding to a first event occurring in the playback of the media content, where the first time information comprises:
a first pre-event time prior to occurrence of the first event in the playback of the media content; and
a first post-event time subsequent to the occurrence of the first event in the playback of the media content;
second time information corresponding to a second event occurring in the playback of the media content, where the second time information comprises:
a second pre-event time prior to occurrence of the second event in the playback of the media content; and
a second post-event time subsequent to the occurrence of the second event in the playback of the media content;
the first event and the second event identified as potentially interesting or significant over other portions of the media content based at least in part on differentiating a threshold number of actions attributed to one or more particular groups of individuals;
identify a first position during the playback of the media content associated with the first pre-event time prior to occurrence of the first event;
automatically adjust, without user input, the playback of the media content to the identified first position, and cause the playback of the media content at the specified frame rate from the identified first position until a subsequent position during the playback that corresponds to the first post-event time;
identify a second position during the playback of the media content associated with the second pre-event time prior to occurrence of the second event; and
automatically adjust, without user input, the playback of the media content to the identified second position, and causing the playback of the media content at the specified frame rate from the identified second position until a subsequent position during the playback that corresponds to the second post-event time.

9. The computing system of claim 8, wherein one or both of the first event and the second event were identified as potentially interesting or significant over other portions of the media content based at least in part on one or more keywords identified in an audio stream of the media content.

10. The computing system of claim 8, wherein one or both of the first event and the second event were identified as potentially interesting or significant over other portions of the media content based at least in part on one or more volume and/or inflection aspects identified in an audio stream of the media content.

11. The computing system of claim 8, wherein one or both of the first event and the second event were identified as potentially interesting or significant over other portions of the media content based at least in part on particular graphics identified in a video stream of the media content.

12. The computing system of claim 8, wherein one or both of the first event and the second event were identified as potentially interesting or significant over other portions of the media content based at least in part on the actions that comprise actions attributed to viewers of the media content that correspond to repeat playbacks of the first event and/or the second event.

13. The computing system of claim 8, wherein one or both of the first event and the second event were identified as potentially interesting or significant over other portions of the media content based at least in part on the actions that comprise user inputs via one or more social networks.

14. The computing system of claim 8, wherein one or both of the first event and the second event were identified as potentially interesting or significant over other portions of the media content based at least in part on information from a plurality of different types of event marking sources comprising two or more of: a manual marking source; a monitored event marking source; an automated event marking source; and/or a crowdsourcing marking source.

15. One or more non-transitory, processor-readable media comprising processor-readable instructions, which, when executed by one or more processing devices, cause the one or more processing devices to:
receive media content;
store the received media content;
process a listing associated with the media content to facilitate playback content at a specified frame rate of only highlights from the media content, the listing comprising:
first time information corresponding to a first event occurring in the playback of the media content, where the first time information comprises:
a first pre-event time prior to occurrence of the first event in the playback of the media content; and
a first post-event time subsequent to the occurrence of the first event in the playback of the media content;
second time information corresponding to a second event occurring in the playback of the media content, where the second time information comprises:
a second pre-event time prior to occurrence of the second event in the playback of the media content; and a second post-event time subsequent to the occurrence of the second event in the playback of the media content;

the first event and the second event identified as potentially interesting or significant over other portions of the media content based at least in part on differentiating a threshold number of actions attributed to one or more particular groups of individuals;

identify a first position during the playback of the media content associated with the first pre-event time prior to occurrence of the first event;

automatically adjust, without user input, the playback of the media content to the identified first position, and cause the playback of the media content at the specified frame rate from the identified first position until a subsequent position during the playback that corresponds to the first post-event time;

identify a second position during the playback of the media content associated with the second pre-event time prior to occurrence of the second event; and automatically adjust, without user input, the playback of the media content to the identified second position, and causing the playback of the media content at the specified frame rate from the identified second position until a subsequent position during the playback that corresponds to the second post-event time.

16. The one or more non-transitory, processor-readable media of claim 15, wherein one or both of the first event and the second event were identified as potentially interesting or significant over other portions of the media content based at least in part on one or more keywords identified in an audio stream of the media content.

17. The one or more non-transitory, processor-readable media of claim 15, wherein one or both of the first event and the second event were identified as potentially interesting or significant over other portions of the media content based at least in part on one or more volume and/or inflection aspects identified in an audio stream of the media content.

18. The one or more non-transitory, processor-readable media of claim 15, wherein one or both of the first event and the second event were identified as potentially interesting or significant over other portions of the media content based at least in part on particular graphics identified in a video stream of the media content.

19. The one or more non-transitory, processor-readable media of claim 15, wherein one or both of the first event and the second event were identified as potentially interesting or significant over other portions of the media content based at least in part on the actions that comprise actions attributed to viewers of the media content that correspond to repeat playbacks of the first event and/or the second event.

20. The one or more non-transitory, processor-readable media of claim 15, wherein one or both of the first event and the second event were identified as potentially interesting or significant over other portions of the media content based at least in part on the actions that comprise actions that correspond to user inputs via one or more social networks.

* * * * *